(12) United States Patent
Nix et al.

(10) Patent No.: US 10,768,621 B1
(45) Date of Patent: Sep. 8, 2020

(54) DETERMINING ROUTES FOR AUTONOMOUS VEHICLES

(71) Applicant: UATC, LLC, San Francisco, CA (US)

(72) Inventors: Molly Castle Nix, San Francisco, CA (US); Dennis Zhao, Pittsburgh, PA (US); Eric James Hanson, San Francisco, CA (US); Sean Rhee Chin, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 333 days.

(21) Appl. No.: 15/789,334

(22) Filed: Oct. 20, 2017

Related U.S. Application Data

(60) Provisional application No. 62/562,879, filed on Sep. 25, 2017.

(51) Int. Cl.
*G05D 1/00* (2006.01)
*G01C 21/34* (2006.01)

(52) U.S. Cl.
CPC ....... *G05D 1/0088* (2013.01); *G01C 21/3407* (2013.01); *G01C 21/3484* (2013.01); *G05D 2201/0213* (2013.01)

(58) Field of Classification Search
CPC ............ G01C 21/3407; G01C 21/3484; G05D 1/0088; G05D 2201/0213
See application file for complete search history.

(56) References Cited

U.S. PATENT DOCUMENTS

| | | | | |
|---|---|---|---|---|
| 10,126,136 | B2 * | 11/2018 | Iagnemma | G05D 1/0088 |
| 2017/0356747 | A1 * | 12/2017 | Iagnemma | G05D 1/0088 |
| 2017/0356750 | A1 * | 12/2017 | Iagnemma | G01C 21/3461 |
| 2018/0196436 | A1 * | 7/2018 | Gupta | G05D 1/0212 |
| 2018/0328743 | A1 * | 11/2018 | Sullivan | G05D 1/0214 |
| 2019/0235517 | A1 * | 8/2019 | Beauvillain | B60W 30/00 |
| 2019/0359220 | A1 * | 11/2019 | Wilson | A61B 5/02055 |
| 2020/0042019 | A1 * | 2/2020 | Marczuk | G08G 1/202 |

* cited by examiner

*Primary Examiner* — Robert T Nguyen
(74) *Attorney, Agent, or Firm* — Schwegman Lundberg & Woessner, P.A.

(57) ABSTRACT

A method for determining and providing alternative routes receives request data associated with a request from a user device. A first canonical route is determined from a plurality of canonical routes based on the request data. Each respective canonical route of the plurality of canonical routes satisfies at least one autonomy criteria associated with whether an autonomous vehicle can travel on the respective canonical route. First route data associated with the first canonical route is provided. Route identification data associated with identifying an alternative canonical route is received after providing the first route data associated with the first canonical route. A second canonical route is determined from the plurality of canonical routes based on the route identification data. Second route data associated with the second canonical route is provided for controlling travel of the autonomous vehicle on the second canonical route.

18 Claims, 11 Drawing Sheets

DETERMINING ROUTES FOR AUTONOMOUS VEHICLES

CROSS REFERENCE TO RELATED APPLICATION

This application claims the benefit of U.S. Provisional Application No. 62/562,879, filed Sep. 25, 2017, the entire disclosure of which is hereby incorporated by reference in its entirety.

BACKGROUND

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without human input. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic signs associated with a route.

SUMMARY

According to some non-limiting embodiments or aspects, provided is a method, including: receiving, with a computer system including one or more processors, request data associated with a request from a user device; determining, with the computer system, a first canonical route from a plurality of canonical routes based on the request data, wherein each respective canonical route of the plurality of canonical routes satisfies at least one autonomy criteria associated with whether an autonomous vehicle can travel on the respective canonical route; providing, with the computer system, first route data associated with the first canonical route; receiving, with the computer system, route identification data associated with identifying an alternative canonical route after providing the first route data associated with the first canonical route; determining, with the computer system, a second canonical route from the plurality of canonical routes based on the route identification data; and providing, with the computer system, second route data associated with the second canonical route for controlling travel of the autonomous vehicle on the second canonical route.

In some non-limiting embodiments or aspects of the method, the first canonical route is determined before receiving an indication that a user associated with the user device is on board the autonomous vehicle.

In some non-limiting embodiments or aspects of the method, the second canonical route is determined after receiving an indication that a user associated with the user device is on board the autonomous vehicle.

In some non-limiting embodiments or aspects of the method, the second canonical route is determined before receiving an indication that a user associated with the user device is on board the autonomous vehicle.

In some non-limiting embodiments or aspects of the method, the first canonical route is determined after receiving an indication that a user associated with the user device is on board the autonomous vehicle.

In some non-limiting embodiments or aspects, the method further comprises controlling travel of the autonomous vehicle on the second canonical route based on the second route data.

In some non-limiting embodiments or aspects, the method further comprises communicating, with the computer system, the second route data associated with the second canonical route to a vehicle computing system of the autonomous vehicle, wherein the vehicle computing system of the autonomous vehicle controls travel of the autonomous vehicle on the second canonical route based on the second route data.

In some non-limiting embodiments or aspects, the method further comprises determining, with the computer system, route preference data based on the request data; and determining, with the computer system, at least one of the first canonical route and the second canonical route based on the route preference data.

In some non-limiting embodiments or aspects of the method, each respective canonical route of the plurality of canonical routes that satisfies at least one objective function derived from trip data associated with one or more traversals of the plurality of canonical routes by one or more autonomous vehicles.

In some non-limiting embodiments or aspects of the method, the plurality of canonical routes comprises one or more roadways, wherein the first route data is associated with a first subset of the one or more roadways, wherein the second route data is associated with a second subset of the one or more roadways.

In some non-limiting embodiments or aspects of the method, determining at least one of the first canonical route and the second canonical route further comprises determining the at least one of the first canonical route and the second canonical route based on current condition data associated with at least one current condition associated with the plurality of canonical routes.

According to some non-limiting embodiments or aspects, provided is a computing system including: one or more processors; a computer system implemented at least in part by the one or more processors, the computer system configured to: receive request data associated with a request from a user device; determine a first canonical route from a plurality of canonical routes based on the request data, wherein each respective canonical route of the plurality of canonical routes satisfies at least one autonomy criteria associated with whether an autonomous vehicle can travel on the respective canonical route; provide first route data associated with the first canonical route; receive route identification data associated with identifying an alternative canonical route after providing the first route data associated with the first canonical route; determine a second canonical route from the plurality of canonical routes based on the route identification data; provide the second route data associated with the second canonical route for controlling travel of the autonomous vehicle on the second canonical route.

In some non-limiting embodiments or aspects, the computing system is further programmed or configured to control travel of the autonomous vehicle on the second canonical route based on the second route data.

In some non-limiting embodiments or aspects, the computing system is further programmed or configured to communicate the second route data associated with the second canonical route to a vehicle computing system of the autonomous vehicle comprising one or more processors, wherein the vehicle computing system of the autonomous vehicle controls travel of the autonomous vehicle on the second canonical route based on the second route data.

In some non-limiting embodiments or aspects of the computing system, each respective canonical route of the plurality of canonical routes satisfies at least one objective function derived from trip data associated with one or more traversals of the plurality of canonical routes by one or more autonomous vehicles.

In some non-limiting embodiments or aspects of the computing system, the plurality of canonical routes comprises one or more roadways, wherein the first route data is associated with a first subset of the one or more roadways, wherein the second route data is associated with a second subset of the one or more roadways.

According to some non-limiting embodiments or aspects, provided is an autonomous vehicle including one or more sensors for detecting an object in an environment surrounding the autonomous vehicle; a vehicle computing system including one or more processors, wherein the vehicle computing system is to: receive request data associated with a request from a user device; determine a first canonical route from a plurality of canonical routes based on the request data, wherein each respective canonical route of the plurality of canonical routes satisfies at least one autonomy criteria associated with whether an autonomous vehicle can travel on the respective canonical route; provide first route data associated with the first canonical route; receive route identification data associated with identifying an alternative canonical route after providing the first route data associated with the first canonical route; determine a second canonical route from the plurality of canonical routes based on the route identification data; provide second route data associated with the second canonical route; and control travel of the autonomous vehicle on the second canonical route based on the second route data and sensor data from the one or more sensors.

In some non-limiting embodiments or aspects of the vehicle computing system, each respective canonical route of the plurality of canonical routes satisfies at least one objective function derived from trip data associated with one or more traversals of the plurality of canonical routes by one or more autonomous vehicles.

In some non-limiting embodiments or aspects of the vehicle computing system, the plurality of canonical routes comprises one or more roadways, wherein the first route data is associated with a first subset of the one or more roadways, and wherein the second route data is associated with a second subset of the one or more roadways.

In some non-limiting embodiments or aspects of the vehicle computing system, the first canonical route is determined after receiving an indication that a user associated with the user device is on board the autonomous vehicle.

According to some non-limiting embodiments or aspects, provided is a computer program product including at least one non-transitory computer-readable medium including one or more instructions that, when executed by at least one processor, cause the at least one processor to: receive request data associated with a request from a user device; determine a first canonical route from a plurality of canonical routes based on the request data, wherein each respective canonical route of the plurality of canonical routes satisfies at least one autonomy criteria associated with whether an autonomous vehicle can travel on the respective canonical route; provide first route data associated with the first canonical route; receive route identification data associated with identifying an alternative canonical route after providing the first route data associated with the first canonical route; determine a second canonical route from the plurality of canonical routes based on the route identification data; provide the second route data associated with the second canonical route for controlling travel of the autonomous vehicle on the second canonical route.

In some non-limiting embodiments or aspects, the computer program product includes further instructions that cause the at least one processor to control travel of the autonomous vehicle on the second canonical route based on the second route data.

In some non-limiting embodiments or aspects, the computer program product includes further instructions that cause the at least one processor to communicate the second route data associated with the second canonical route to a vehicle computing system of the autonomous vehicle comprising one or more processors, wherein the vehicle computing system of the autonomous vehicle controls travel of the autonomous vehicle on the second canonical route based on the second route data.

In some non-limiting embodiments or aspects of the computer program product, each respective canonical route of the plurality of canonical routes satisfies at least one objective function derived from trip data associated with one or more traversals of the plurality of canonical routes by one or more autonomous vehicles.

In some non-limiting embodiments or aspects of the computer program product, the plurality of canonical routes comprises one or more roadways, wherein the first route data is associated with a first subset of the one or more roadways, wherein the second route data is associated with a second subset of the one or more roadways.

Further non-limiting embodiments or aspects are set forth in the following numbered clauses:

Clause 1: A method, comprising: receiving, with a computer system comprising one or more processors, request data associated with a request from a user device; determining, with the computer system, a first canonical route from a plurality of canonical routes based on the request data, wherein each respective canonical route of the plurality of canonical routes satisfies at least one autonomy criteria associated with whether an autonomous vehicle can travel on the respective canonical route; providing, with the computer system, first route data associated with the first canonical route; receiving, with the computer system, route identification data associated with identifying an alternative canonical route after providing the first route data associated with the first canonical route; determining, with the computer system, a second canonical route from the plurality of canonical routes based on the route identification data; and providing, with the computer system, second route data associated with the second canonical route for controlling travel of the autonomous vehicle on the second canonical route.

Clause 2: The method of clause 1, wherein the first canonical route is determined before receiving an indication that a user associated with the user device is on board the autonomous vehicle.

Clause 3: The method of clauses 1 or 2, wherein the second canonical route is determined after receiving an indication that a user associated with the user device is on board the autonomous vehicle.

Clause 4: The method of any of clauses 1-3, wherein the second canonical route is determined before receiving an indication that a user associated with the user device is on board the autonomous vehicle.

Clause 5: The method of any of clauses 1-4, wherein the first canonical route is determined after receiving an indication that a user associated with the user device is on board the autonomous vehicle.

Clause 6: The method of any of clauses 1-5, further comprising: controlling travel of the autonomous vehicle on the second canonical route based on the second route data.

Clause 7: The method of any of clauses 1-6, further comprising: communicating the second route data associated with the second canonical route to a vehicle computing system of the autonomous vehicle, wherein the vehicle computing system of the autonomous vehicle controls travel of the autonomous vehicle on the second canonical route based on the second route data.

Clause 8: The method of any of clauses 1-7, further comprising: determining route preference data based on the request data; and determining at least one of the first canonical route and the second canonical route based on the route preference data.

Clause 9: The method of any of clauses 1-8, wherein the each respective canonical route of the plurality of canonical routes satisfies at least one objective function derived from trip data associated with one or more traversals of the plurality of canonical routes by one or more autonomous vehicles.

Clause 10: The method of any of clauses 1-9, wherein the plurality of canonical routes comprises one or more roadways, wherein the first route data is associated with a first subset of the one or more roadways, wherein the second route data is associated with a second subset of the one or more roadways.

Clause 11: The method of any of clauses 1-10, wherein determining at least one of the first canonical route and the second canonical route further comprises determining the at least one of the first canonical route and the second canonical route based on current condition data associated with at least one current condition associated with the plurality of canonical routes.

Clause 12: A computing system, comprising: one or more processors to: receive request data associated with a request from a user device; and determine a first canonical route from a plurality of canonical routes based on the request data, wherein each respective canonical route of the plurality of canonical routes satisfies at least one autonomy criteria associated with whether an autonomous vehicle can travel on the respective canonical route; provide first route data associated with the first canonical route; receive route identification data associated with identifying an alternative canonical route after providing the first route data associated with the first canonical route; determine a second canonical route from the plurality of canonical routes based on the route identification data; and provide second route data associated with the second canonical route for controlling travel of the autonomous vehicle on the second canonical route.

Clause 13: The computing system of clause 12, wherein the one or more processors are further to: control travel of the autonomous vehicle on the second canonical route based on the second route data.

Clause 14: The computing system of clauses 12 or 13, wherein the one or more processors are further to: communicate the second route data associated with the second canonical route to a vehicle computing system of the autonomous vehicle comprising one or more processors, wherein the vehicle computing system of the autonomous vehicle controls travel of the autonomous vehicle on the second canonical route based on the second route data.

Clause 15: The computing system of any of clauses 12-14, wherein the each respective canonical route of the plurality of canonical routes satisfies at least one objective function derived from trip data associated with one or more traversals of the plurality of canonical routes by one or more autonomous vehicles.

Clause 16: The computing system of any of clauses 12-15, wherein the plurality of canonical routes comprises one or more roadways, wherein the first route data is associated with a first subset of the one or more roadways, wherein the second route data is associated with a second subset of the one or more roadways.

Clause 17: An autonomous vehicle, comprising: one or more sensors for detecting an object in an environment surrounding the autonomous vehicle; and a vehicle computing system comprising one or more processors, wherein the vehicle computing system is to: receive request data associated with a request from a user device; determine a first canonical route from a plurality of canonical routes based on the request data, wherein each respective canonical route of the plurality of canonical routes satisfies at least one autonomy criteria associated with whether an autonomous vehicle can travel on the respective canonical route; provide first route data associated with the first canonical route; receive route identification data associated with identifying an alternative canonical route after providing the first route data associated with the first canonical route; determine a second canonical route from the plurality of canonical routes based on the route identification data; provide second route data associated with the second canonical route; and control travel of the autonomous vehicle on the second canonical route based on the second route data and sensor data from the one or more sensors.

Clause 18: The autonomous vehicle of clause 17, wherein the each respective canonical route of the plurality of canonical routes satisfies at least one objective function derived from trip data associated with one or more traversals of the plurality of canonical routes by one or more autonomous vehicles.

Clause 19: The autonomous vehicle of clauses 17 or 18, wherein the plurality of canonical routes comprises one or more roadways, wherein the first route data is associated with a first subset of the one or more roadways, and wherein the second route data is associated with a second subset of the one or more roadways.

Clause 20: The autonomous vehicle of any of clauses 17-19, wherein the first canonical route is determined after receiving an indication that a user associated with the user device is on board the autonomous vehicle.

DETAILED DESCRIPTION

The following detailed description of non-limiting embodiments refers to the accompanying drawings. The same reference numbers in different drawings may identify the same or similar elements.

In some non-limiting embodiments, a map of a geographic location is used for routing an autonomous vehicle on roadways specified in the map. For example, a route including one or more roadways is determined for an autonomous vehicle between a pick-up location (or a current location) and a destination location based on the map.

However, the autonomous vehicle may be routed on one or more routes that are not generated based on data associated with identifying an alternative canonical route. For example, in some non-limiting embodiments, a user or rider prefers an alternative route to the route determined for the autonomous vehicle. In this way, the autonomous vehicle may be operated on a route that is not customized or personalized for the user.

As disclosed herein, in some non-limiting embodiments, a service system and/or a vehicle computing system receive request data associated with a request from a user device, determine a first canonical route from a plurality of canonical routes based on the request data, provide a first canonical route from a plurality of canonical routes based on the request data, receive route identification data associated with identifying an alternative canonical route after providing the first route data associated with the first canonical route, determine a second canonical route from the plurality of canonical routes based on the route identification data, and provide second route data associated with the second canonical route for controlling travel of the autonomous vehicle on the second canonical route. In this way, the service system and/or the vehicle computing system generate a route based on data associated with identifying an alternative route. Accordingly, the service system and/or the vehicle computing system enable the autonomous vehicle to be operated on a canonical route that is customized or personalized for the user.

Figure 1:
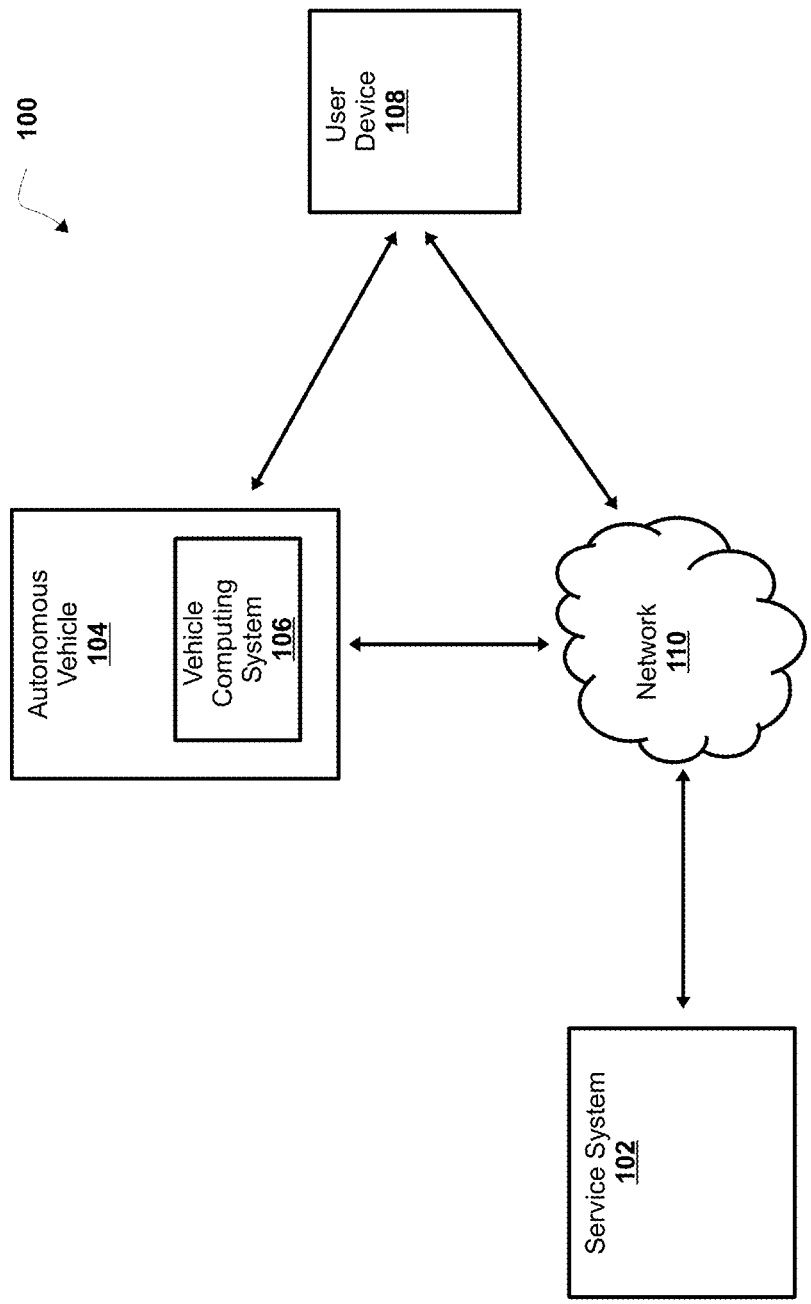
FIG. 1 is a schematic diagram of a non-limiting embodiment or aspect of an environment in which systems and/or methods, described herein, can be implemented.

Referring now to FIG. 1, FIG. 1 is a diagram of a non-limiting embodiment of an environment 100 in which systems and/or methods, described herein, can be implemented. As shown in FIG. 1, environment 100 includes service system 102, autonomous vehicle 104 including vehicle computing system 106, user device 108, and network 110. Systems and/or devices of environment 100 can interconnect via wired connections, wireless connections, or a combination of wired and wireless connections.

In some non-limiting embodiments, service system 102, such as a service platform for providing services for an application platform, such as a transportation platform, a ride sharing platform, a delivery service platform, a courier service platform, or the like, includes one or more devices capable of communicating with user device 108 to provide user access to an application platform. As an example, service system 102 communicates with vehicle computing system 106 to provision services associated with an application platform, such as a transportation platform, a ride sharing platform, a delivery service platform, a courier service platform, and/or other service platforms. In some non-limiting embodiments, service system 102 is associated with a central operations system and/or an entity associated with autonomous vehicle 104 and/or an application platform such as, for example, an autonomous vehicle owner, autonomous vehicle manager, fleet operator, service provider, etc.

In some non-limiting embodiments, service system 102 includes one or more devices capable of receiving request data associated with a request from user device 108, determining a first canonical route from a plurality of canonical routes based on the request data, providing first route data associated with the first canonical route, receiving route identification data associated with identifying an alternative canonical route after providing the first route data associated with the first canonical route, determining a second canonical route from the plurality of canonical routes based on route identification data, and providing second route data associated with the second canonical route for controlling travel of autonomous vehicle 104 on the second canonical route. For example, service system 102 includes one or more computing systems including one or more processors (e.g., one or more servers, etc.).

In some non-limiting embodiments, service system 102 includes one or more devices capable of providing user device 108 with the first canonical route customized for the user and/or the request based on the request data for display to the user on user device 108 and receiving from user device 108 an identification from the user of an alternative route, such as a selection of a routing option within the first canonical route, an identification of one or more routes or roadways within the first canonical route, and/or an identification of one or more routes or roadways outside or not included in the first canonical route. For example, the second canonical route can be a user-identified canonical route that has been customized for the user, and service system 102 is capable of providing the second route data to vehicle computing system 106 of autonomous vehicle 104.

In some non-limiting embodiments, autonomous vehicle 104 including vehicle computing system 106 includes one or more devices capable of receiving request data associated with a request from a user device, determining a first canonical route from a plurality of canonical routes based on the request data, providing first route data associated with the first canonical route, receiving route identification data associated with identifying an alternative canonical route after providing the first route data associated with the first canonical route, determining a second canonical route from the plurality of canonical routes based on route identification data, and providing second route data associated with the second canonical route for controlling travel of the autonomous vehicle on the second canonical route. For example, autonomous vehicle 104 including vehicle computing system 106 includes one or more computing systems including one or more processors (e.g., one or more servers, etc.).

In some non-limiting embodiments, vehicle computing system 106 includes one or more devices capable of receiving the request data from user device 108 (e.g., via service system 102, or from user device 108 implemented as a vehicle device on board autonomous vehicle 104 configured to provide user input directly to vehicle computing system 106). In some non-limiting embodiments, vehicle computing system 106 includes one or more devices capable of providing the first route data for display on user device 108 and/or user device 108 implemented as the vehicle device. In some non-limiting embodiments, vehicle computing system 106 includes one or more devices capable of receiving the route identification data from user device 108 and/or user device 108 implemented as the vehicle device and controlling travel of autonomous vehicle 104 on the first canonical route based on the first route data and/or on the second canonical route based on the second route data. Further details regarding a non-limiting embodiment of autonomous vehicle 104 are provided below with regard to FIG. 2.

In some non-limiting embodiments, service system 102 and/or autonomous vehicle 104 include one or more devices capable of receiving, storing, and/or providing map data associated with a map of a geographic location (e.g., a country, a state, a city, a portion of a city, a township, a portion of a township, etc.). For example, maps are used for routing an autonomous vehicle on a roadway specified in the map. In some non-limiting embodiments, map data includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, or the like), or the like. In some non-limiting embodiments, a map of a geographic location includes one or more routes that include one or more roadways. In some non-limiting embodiments, map data associated with a map of the geographic location associates each roadway of the one or more roadways with an indication of whether autonomous vehicle 104 can travel on that roadway.

In some non-limiting embodiments, a road refers to a paved or otherwise improved path between two places that allows for travel by a vehicle (e.g., autonomous vehicle 104). Additionally or alternatively, a road includes a roadway and a sidewalk in proximity to (e.g., adjacent, near, next to, touching, etc.) the roadway. In some non-limiting embodiments, a roadway includes a portion of road on which a vehicle is intended to travel and is not restricted by a physical barrier or by separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. In some non-limiting embodiments, a roadway is connected to another roadway, for example a lane of a roadway is connected to another lane of the roadway and/or a lane of the roadway is connected to a lane of another roadway.

In some non-limiting embodiments, a canonical route includes one or more roadways that are connected with another roadway in a geographic location, where the canonical route satisfies at least one autonomy criteria associated with whether autonomous vehicle 104 can travel on the one or more roadways that are connected with another roadway. For example, autonomy criteria are associated with an indication of whether autonomous vehicle 104 can travel on a route or a roadway. In some non-limiting embodiments, the indication of whether autonomous vehicle 104 can travel on a route or a roadway is based on whether a traversal of the route or the roadway requires an autonomous vehicle to perform one or more prohibited actions, such as a U-turn on the route or the roadway, crossing a railway track on the route or the roadway, performing an unprotected turn on the route or the roadway, performing a turn that includes crossing a bicycle lane on the route or the roadway, and/or the like.

In some non-limiting embodiments, a geographic location includes a plurality of canonical routes that include one or more roadways, and map data associated with a map of the geographic location associates each roadway of the one or more roadways with an indication of whether autonomous vehicle 104 can travel on that roadway. In some non-limiting embodiments, the plurality of canonical routes is determined based on (e.g., satisfying) at least routing determination function, such as a route optimization function (e.g., an objective function, a non-linear integer programming function, a growing algorithm, a trimming algorithm, etc.) derived from trip data associated with one or more traversals of the plurality of canonical routes by one or more autonomous vehicles. For example, the plurality of canonical routes is determined according to a number of interventions associated with the one or more autonomous vehicles traveling on the plurality of canonical routes, a number of hazards associated with the one or more autonomous vehicles traveling on the plurality of canonical routes, or any combination thereof.

In some non-limiting embodiments, user device 108 includes one or more devices capable of receiving information from and/or transmitting information to vehicle computing system 106 and service system 102 (e.g., via network 110). As an example, user device 108 includes a client device, a computer device, a mobile device, and/or the like. For example, a mobile device includes one or more portable electronic devices configured to communicate with one or more other electronic devices via a network (e.g., network 110). For example, a mobile device includes a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices.

In some non-limiting embodiments, user device 108 includes one or more devices capable of providing the user with access to the application platform and enables the user to establish/maintain a user account for the application platform, request services associated with the application platform, and/or establish/maintain a user profile including preferences for the provided services. In some non-limiting embodiments, user device 108 includes and/or is implemented as a vehicle device on board and/or integrated with autonomous vehicle 104. As an example, user device 108 implemented as a vehicle device includes a computer device (e.g., a tablet computer) permanently or semi-permanently associated with autonomous vehicle 104 and capable of communicating directly with vehicle computing system 106. For example, user device 108 implemented as a vehicle device includes one or more devices capable of receiving user input, such as request data, route identification data, and/or route preference data, from a plurality of users over a plurality of trips serviced by autonomous vehicle 104.

In some non-limiting embodiments, autonomous vehicle 104 and/or user device 108 implemented as a vehicle device on board autonomous vehicle 104 includes one or more devices capable of determining that a user associated with user device 108 is on board autonomous vehicle 104 and/or providing an indication to service system 102 and/or vehicle computing system 106 that a user associated with user device 108 is on board autonomous vehicle 104. As an example, autonomous vehicle 104 and/or user device 108 implemented as a vehicle device on board autonomous vehicle 104 can include one or more sensors configured to determine a presence of a user associated with user device 108 or user device 108 on board autonomous vehicle 104 based on one or more of the following: input from the user (e.g., received via user device 108 implemented as a vehicle device on board autonomous vehicle 104), indicating that the user is on board autonomous vehicle, presence data from user device 108 (e.g., received via a short-range wireless communication protocol, such as a RFID protocol) indicating that user device 108 is on board autonomous vehicle 104, biometric data (e.g., received via one or more biometric sensors), indicating that the user is on board autonomous vehicle 104.

In some non-limiting embodiments, network 110 includes one or more wired and/or wireless networks. For example, network 110 includes a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100. As an example, in some non-limiting embodiments, a computer system is implemented within service system 102 or vehicle computing system 106, or implemented as multiple, distributed systems within and/or across service system 102 and vehicle computing system 106. For example, service system 102 can determine a first canonical route before the user is picked up for the service, and vehicle computing system 106 can determine a second canonical route based on route identification data after receiving an indication that a user associated with user device 108 is on board autonomous vehicle 104.

Figure 2:
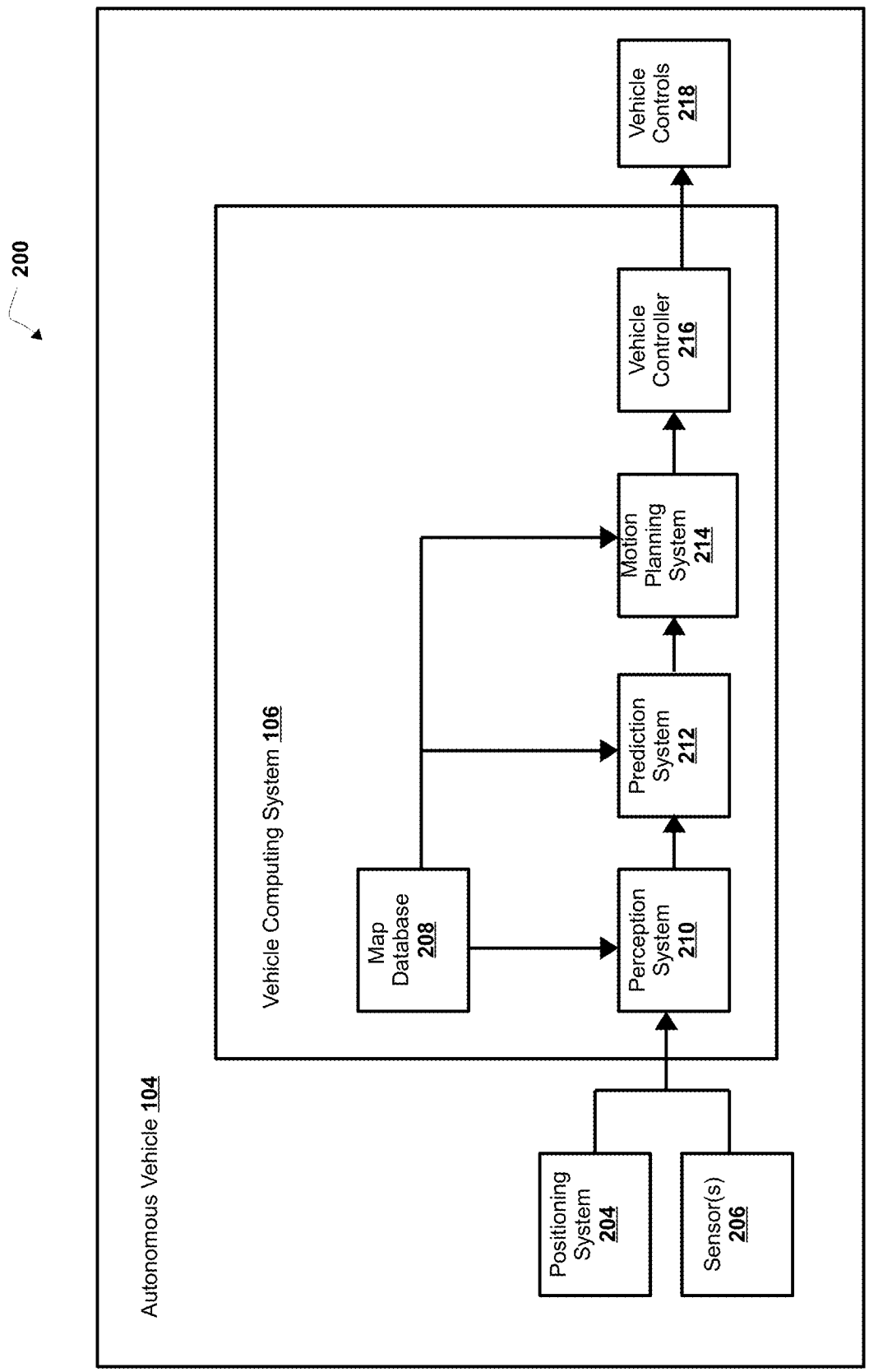
FIG. 2 is a schematic diagram of a non-limiting embodiment or aspect of a system for controlling an autonomous vehicle shown in FIG. 1.

Referring now to FIG. 2, FIG. 2 is a diagram of a non-limiting embodiment of a system 200 for controlling autonomous vehicle 104. As shown in FIG. 2, vehicle computing system 106 includes perception system 210, prediction system 212, and motion planning system 214 that cooperate to perceive a surrounding environment of autonomous vehicle 104 and determine a motion plan for controlling the motion (e.g., the direction of travel) of autonomous vehicle 104 accordingly.

In some non-limiting embodiments, vehicle computing system 106 is connected to or includes positioning system 204. In some non-limiting embodiments, positioning system 204 determines a position (e.g., a current position, a past position, etc.) of autonomous vehicle 104. In some non-limiting embodiments, positioning system 204 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, WiFi access points, etc.), and/or proximity to network components, or the like. In some non-limiting embodiments, the position of autonomous vehicle 104 is used by vehicle computing system 106.

In some non-limiting embodiments, perception system 210 receives sensor data from one or more sensors 206 that are coupled to or otherwise included in autonomous vehicle 104. For example, one or more sensors 206 include a light detection and ranging (LIDAR) system, a radio detection and ranging (RADAR) system, one or more cameras (e.g., visible spectrum cameras, infrared cameras, etc.), and/or the like. In some non-limiting embodiments, the sensor data includes data that describes a location of objects within the surrounding environment of the autonomous vehicle 104. In some non-limiting embodiments, one or more sensors 206 collect sensor data that includes data that describes a location (e.g., in three-dimensional space relative to the autonomous vehicle 104) of points that correspond to objects within the surrounding environment of autonomous vehicle 104.

In some non-limiting embodiments, the sensor data includes a location (e.g., a location in three-dimensional space relative to the LIDAR system) of a number of points (e.g., a point cloud) that correspond to objects that have reflected a ranging laser. In some non-limiting embodiments, the LIDAR system measures distances by measuring a time of flight (TOF) that a short laser pulse takes to travel from a sensor of the LIDAR system to an object and back, and the LIDAR system calculates the distance of the object to the LIDAR system based on the known speed of light.

In some non-limiting embodiments, the sensor data includes a location (e.g., a location in three-dimensional space relative to the RADAR system) of a number of points that correspond to objects that have reflected a ranging radio wave. In some non-limiting embodiments, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments, the RADAR system provides information about the location and/or the speed of an object relative to the RADAR system based on the radio waves.

In some non-limiting embodiments, image processing techniques (e.g., range imaging techniques such as, for example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments, perception system 210 detects and/or tracks objects (e.g., vehicles, pedestrians, bicycles, and the like) that are proximate to (e.g., in proximity to the surrounding environment of) the autonomous vehicle 104 over a time period. In some non-limiting embodiments, perception system 210 can retrieve (e.g., obtain) map data from map database 208 that provides detailed information about the surrounding environment of the autonomous vehicle 104.

In some non-limiting embodiments, perception system 210 determines one or more objects that are proximate to autonomous vehicle 104 based on sensor data received from one or more sensors 206 and/or map data from map database 208. For example, perception system 210 determines, for the one or more objects that are proximate, state data associated with a state of such object. In some non-limiting embodiments, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with acceleration rate of the object (e.g., an estimated acceleration rate of the object, etc.), data associated with an orientation of the object (e.g., a current orientation, etc.), data associated with a size of the object (e.g., a size of the object as represented by a bounding shape such as a bounding polygon or polyhedron, a footprint of the object, etc.), data associated with a type of the object (e.g., a class of the object, an object with a type of vehicle, an object with a type of pedestrian, an object with a type of bicycle, etc.), or the like. In some implementations, perception system 210 determines state data for an object over a number of iterations of determining state data. For example, perception system 210 updates the state data for each object of a plurality of objects during each iteration.

In some non-limiting embodiments, prediction system 212 receives the state data associated with one or more objects from perception system 210. Prediction system 212 predicts one or more future locations for the one or more objects based on the state data. For example, prediction system 212 predicts the future location of each object of a plurality of objects within a time period (e.g., 5 seconds, 10 seconds, 20 seconds, etc.). In some non-limiting embodiments, prediction system 212 predicts that an object will adhere to the object's direction of travel according to the speed of the object. In some non-limiting embodiments, prediction system 212 uses machine learning techniques or modeling techniques to make a prediction based on state data associated with an object.

In some non-limiting embodiments, motion planning system 214 determines a motion plan for autonomous vehicle 104 based on a prediction of a location associated with an object provided by prediction system 212 and/or based on state data associated with the object provided by perception system 210. For example, motion planning system 214 determines a motion plan (e.g., an optimized motion plan) for the autonomous vehicle 104 that causes autonomous vehicle 104 to travel relative to the object based on the prediction of the location for the object provided by prediction system 212 and/or the state data associated with the object provided by perception system 210.

In some non-limiting embodiments, motion planning system 214 determines a cost function for each of one or more motion plans for autonomous vehicle 104 based on the locations and/or predicted locations of one or more objects. For example, motion planning system 214 determines the cost function that describes a cost (e.g., a cost over a time period) of following (e.g., adhering to) a motion plan (e.g., a selected motion plan, an optimized motion plan, etc.). In some non-limiting embodiments, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments, motion planning system 214 determines a cost of following a motion plan. For example, motion planning system 214 determines a motion plan for autonomous vehicle 104 based on one or more cost functions. In some non-limiting embodiments, motion planning system 214 determines a motion plan (e.g., a selected motion plan, an optimized motion plan, a preferred motion plan, etc.) that minimizes a cost function. In some non-limiting embodiments, motion planning system 214 provides a motion plan to vehicle controller 216 and vehicle controller 216 controls one or more vehicle controls 218 (e.g., a device that controls acceleration, a device that controls steering, a device that controls braking, an actuator that controls gas flow, etc.) to implement the motion plan.

Figure 3:
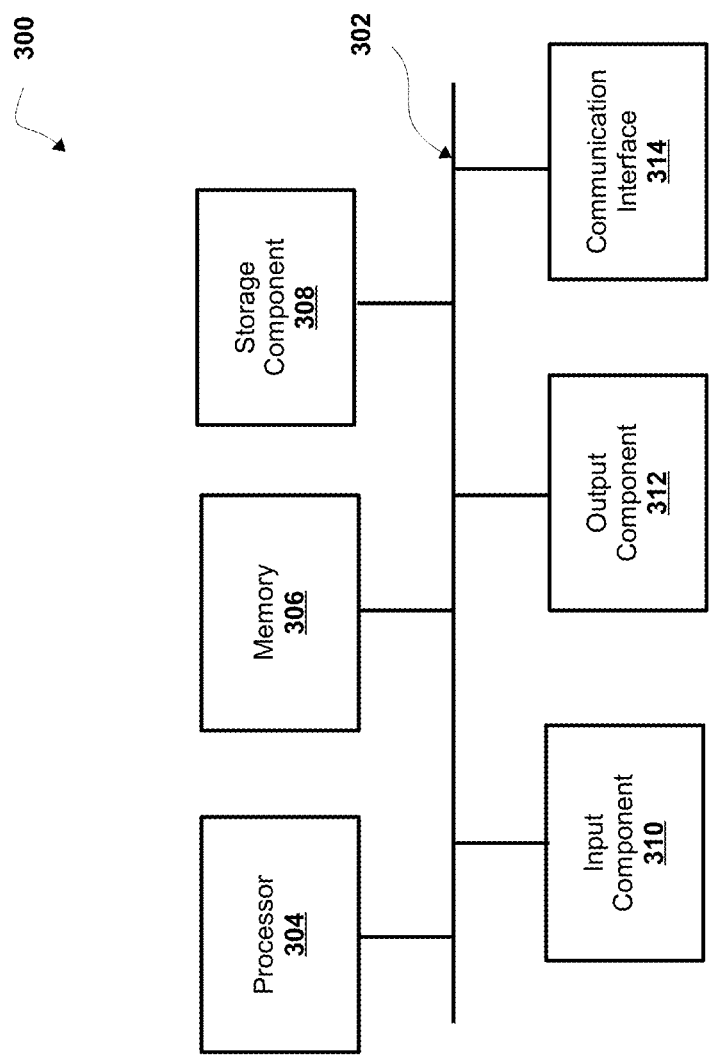
FIG. 3 is a schematic diagram of a non-limiting embodiment or aspect of components of one or more devices of FIGS. 1 and 2.

Referring now to FIG. 3, FIG. 3 is a diagram of example components of a device 300. Device 300 corresponds to one or more devices of service system 102, one or more devices of (e.g., one or more devices of a system of) autonomous vehicle 104, one or more devices of vehicle computing system 106, and/or one or more devices of user device 108. In some non-limiting embodiments, one or more devices of service system 102, one or more devices of (e.g., one or more devices of a system of) autonomous vehicle 104, one or more devices of vehicle computing system 106, and/or one or more devices of user device 108 include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments, processor 304 can be implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random-access memory (RAM), a read only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 permits device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

Device 300 performs one or more processes described herein. Device 300 can perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 includes additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
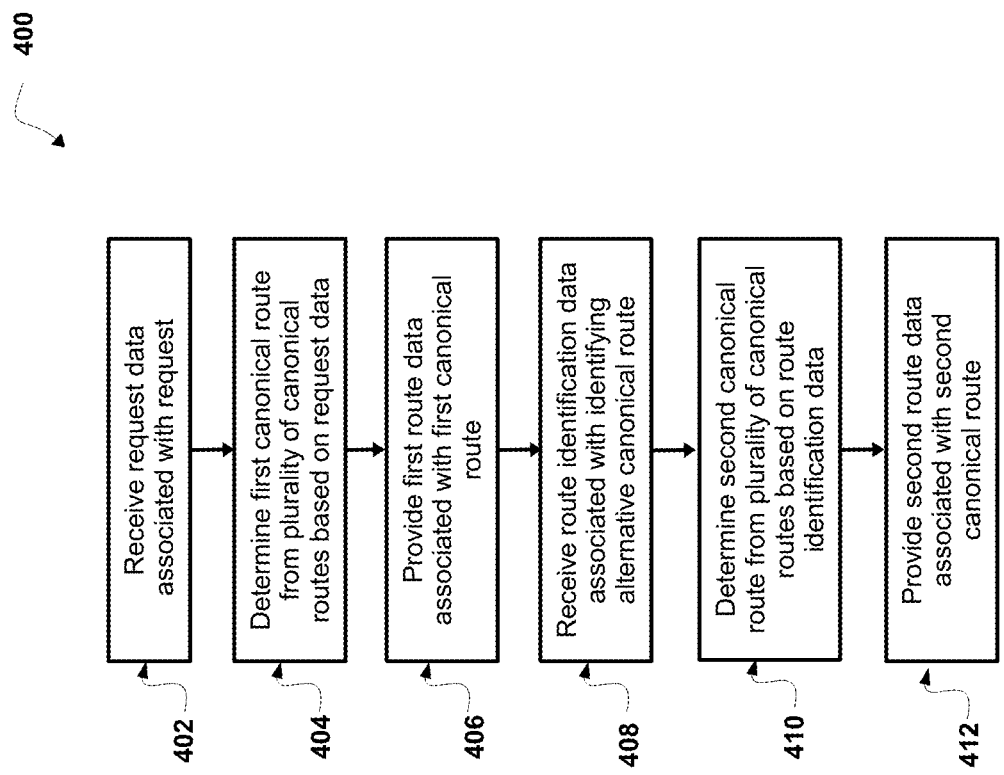
FIG. 4 is a flowchart of a non-limiting embodiment or aspect of a process for determining and providing alternative routes.

Referring now to FIG. 4, FIG. 4 is a flowchart of a non-limiting embodiment of a process 400 for determining and providing alternative routes. In some non-limiting embodiments, one or more of the steps of process 400 are performed (e.g., completely, partially, etc.) by service system 102 (e.g., one or more devices of service system 102). In some non-limiting embodiments, one or more steps of process 400 are performed (e.g., completely, partially, etc.) by vehicle computing system 106 (e.g., one or more devices of vehicle computing system 106). In some non-limiting embodiments, one or more steps of process 400 are performed by service system 102 (e.g., one or more devices of service system 102) and one or more steps of process 400 are performed (e.g., completely, partially, etc.) by vehicle computing system 106 (e.g., one or more devices of vehicle computing system 106). For example, a computer system is implemented within service system 102 or vehicle computing system 106, or implemented as multiple, distributed systems within and/or across service system 102 and vehicle computing system 106. In some non-limiting embodiments, one or more of the steps of process 400 are performed (e.g., completely, partially, etc.) by another device or a group of devices separate from or including service system 102 and/or vehicle computing system 106, such as autonomous vehicle 104 (e.g., one or more devices of autonomous vehicle 104), and/or user device 108 (e.g., one or more devices of user device 108).

As shown in FIG. 4, at step 402, process 400 includes receiving request data associated with a request from a user device. For example, service system 102 and/or vehicle computing system 106 receive request data from user device 108. In some non-limiting embodiments, service system 102 and/or vehicle computing system 106 receive request data from user device 108 that includes an identifier of the user and/or user device 108 associated with the request, a pick-up location, and a destination location. For example, the request data is associated with a request for service, such as a transportation trip, a rideshare trip, a delivery trip, a courier trip, or the like. In some non-limiting embodiments, the request data is associated with a request to route by and/or stop at one or more waypoints, such as restaurants, stores, sites, etc., between the pick-up location (or a current location) and the destination location.

In some non-limiting embodiments, service system 102 and/or vehicle computing system 106 receive request data from user device 108 during a trip, and the request data is associated with a request to modify a trip that is currently in progress (e.g., a request to modify a current canonical route over which autonomous vehicle 104 is currently traveling). As an example, the request data is associated with a request to route over one or more alternative routes or roadways, a request to route to an alternative destination, a request to route by and/or stop at one or more waypoints, and/or the like. For example, the request data includes route preference data associated with one or more route preferences for use in determining an alternative canonical route and/or route identification data associated with identifying an alternative canonical route.

In some non-limiting embodiments, service system 102 and/or vehicle computing system 106 receive request data from user device 108 via network 110. Additionally or alternatively, in some non-limiting embodiments, vehicle computing system 106 receives request data directly from user device 108 implemented as a vehicle device within autonomous vehicle 104. For example, autonomous vehicle 104 includes a tablet computer that displays current routing data and/or information to the user and receives input from the user, such as requests, route identifications, and/or route preferences.

As further shown in FIG. 4, at step 404, process 400 includes determining a first canonical route from a plurality of canonical routes based on the request data. For example, service system 102 and/or vehicle computing system 106 determine a first canonical route from a plurality of canonical routes based on the request data. In some non-limiting embodiments, each respective canonical route of the plurality of canonical routes satisfies at least one autonomy criteria associated with whether an autonomous vehicle can travel on the respective canonical route. In some non-limiting embodiments, service system 102 and/or vehicle computing system 106 determine the first canonical route between the pick-up location (or a current location) and the destination location (and, if necessary, waypoints therebetween) from the plurality of canonical routes by adjusting costs of routes or roadways in the plurality of canonical routes based on the request data and determining routes or roadways that satisfy one or more threshold costs for the first canonical route. As an example, request data is associated with factors or weights that modify costs of routes or roadways in the plurality of canonical routes, where the costs of the routes or roadways are used for including or favoring the routes or roadways (or excluding or disfavoring the routes or roadways) for determination as the first canonical route. For example, service system 102 and/or vehicle computing system 106 determine the first canonical route based on one or more cost functions that describe costs of including routes or roadways in the first canonical route and, in some non-limiting embodiments, determine the first canonical route to minimize a cost function. In some non-limiting embodiments, service system 102 and/or vehicle computing system 106 generate the first canonical route based on a machine learning technique. Further details regarding step 404 of process 400 are provided below with regard to FIG. 5.

As further shown in FIG. 4, at step 406, process 400 includes providing first route data associated with the first canonical route. For example, service system 102 and/or vehicle computing system 106 provide first route data associated with the first canonical route (e.g., to user device 108). In some non-limiting embodiments, the first route data is associated with a first subset of the one or more roadways in the plurality of canonical routes. For example, the first route data identifies one or more roadways that are connected with another roadway in the geographic location and/or information associated with the roadways, such as map data associated with the roadways, for the first canonical route. In some non-limiting embodiments, the first route data includes current condition data and/or service data associated with the roadways as described in more detail below with respect to FIG. 5.

In some non-limiting embodiments, service system 102 and/or vehicle computing system 106 provide the first route data for display on user device 108. As an example, user device 108, such as a smartphone of the user, and/or user device 108 implemented as a vehicle computing device, such as a tablet computer integrated within autonomous vehicle 104, displays one or more images representing the first canonical route within an image of a map of the geographic location.

In some non-limiting embodiments, the first route data is provided as a plurality of optional routes within the first canonical route with a prompt that requests the user to input, via user device 108, an identification of an alternative canonical route from the plurality of optional routes in the first canonical route. In some non-limiting embodiments, the first route data is provided as the first canonical route with an option for the user to identify, via user device 108, routes or roadways within and/or outside or not included in the first canonical route as an alternative canonical route.

In some non-limiting embodiments, service system 102 and/or vehicle computing system 106 determine and/or provide the first route data in response to receiving the request data (e.g., in response to receiving a request for service or a request to modify a current trip or route). In some non-limiting embodiments, service system 102 and/or vehicle computing system 106 determine and/or provide the first route data in response to a change in one or more route preferences of the user and/or one or more current conditions of the plurality of routes as described in more detail below with respect to FIG. 5.

As further shown in FIG. 4, at step 408, process 400 includes receiving route identification data associated with identifying an alternative canonical route after providing the first route data associated with the first canonical route. For example, service system 102 and/or vehicle computing system 106 receive route identification data associated with identifying an alternative canonical route (e.g., from user device 108) after providing the first route data associated with the first canonical route. In some non-limiting embodiments, the route identification data is associated with an identification of an alternative subset of the one or more roadways in the plurality of canonical routes for an alternative canonical route and/or includes route preference data including one or more route preferences that service system 102 and/or vehicle computing system 106 can use to determine the alternative canonical route. As an example, service system 102 and/or vehicle computing system 106 receive route identification data associated with an identification of an alternative canonical route from a plurality of optional routes in a first canonical route as the alternative canonical route. As an example, service system 102 and/or vehicle computing system 106 receive route identification data associated with an identification of an alternative subset of the one or more roadways in the plurality of canonical routes (e.g., routes or roadways within and/or outside the first canonical route), for the alternative canonical route. For example, the route identification data is associated with including or favoring routes or roadways for determination as an alternative or second canonical route and/or excluding or disfavoring routes or roadways for determination as an alternative or second canonical route. As an example, service system 102 and/or vehicle computing system 106 receive route identification data that includes route preference data associated with one or more route preferences for use in determining the alternative canonical route. For example, one or more route preferences of the user are received in addition to, or in place of, an identification of an alternative subset of the one or more roadways in the plurality of canonical routes, and the one or more route preferences of the user are associated with including or favoring routes or roadways for determination as an alternative or second canonical route and/or excluding or disfavoring routes or roadways for determination as an alternative or second canonical route.

In some non-limiting embodiments, service system 102 and/or vehicle computing system 106 receive route identification data from user device 108 in response to providing the first route data to user device 108 (e.g., in response to providing a prompt or option to the user, via user device 108, for input associated with an alternative canonical route). In some non-limiting embodiments, service system 102 and/or vehicle computing system 106 receive route identification data associated with an alternative canonical route input of its own accord, without prompting from the user. For example, service system 102 and/or vehicle computing system 106 receive request data and/or route identification data associated with a request to modify a current route on which autonomous vehicle 104 is currently traveling (or currently determined for travel on after the user associated with user device 108 is on board autonomous vehicle 104) from user device 108.

As further shown in FIG. 4, at step 410, process 400 includes determining a second canonical route from the plurality of canonical routes based on the route identification data. For example, service system 102 and/or vehicle computing system 106 determine a second canonical route from the plurality of canonical routes based on the route identification data. In some non-limiting embodiments, service system 102 and/or vehicle computing system 106 determine the second canonical route between the pick-up location (or a current location) and the destination location (and including waypoints therebetween) from the plurality of canonical routes by adjusting costs of routes or roadways in the plurality of canonical routes based on the route identification data and determining routes or roadways that satisfy one or more threshold costs for the second canonical route. As an example, an identification of an alternative subset of the one or more routes or roadways in the plurality of canonical routes for an alternative canonical route is associated with factors or weights that modify costs of the one or more identified routes or roadways, where the costs of the routes or roadways are used for including or favoring the identified routes or roadways (or excluding or disfavoring the identified routes or roadways) for determination as the second canonical route. For example, service system 102 and/or vehicle computing system 106 determine the second canonical route based on one or more cost functions that describe costs of including routes or roadways in the first canonical route and, in some non-limiting embodiments, determine the second canonical route to minimize a cost function. In some non-limiting embodiments, service system 102 and/or vehicle computing system 106 generate the second canonical route based on a machine learning technique. Further details regarding step 410 of process 400 are provided below with regard to FIG. 5.

In some non-limiting embodiments, the first canonical route is determined before receiving an indication that a user associated with user device 108 is on board autonomous vehicle 104. As an example, service system 102 determines the first canonical route before the user is picked up for the service, which enables providing the user with the first canonical route on user device 108 in advance of the trip so that the user has time to consider the first canonical route and service system 102 can receive route identification data associated with identifying an alternative canonical route before the user is picked up for the service. For example, service system 102 receives a request for service and/or a request to modify the first canonical route from user device 108 before the user is picked up for the service.

In some non-limiting embodiments, the second canonical route is determined before receiving an indication that a user associated with user device 108 is on board autonomous vehicle 104. As an example, service system 102 determines the second canonical route from the plurality of canonical routes based on the route identification data before the user is picked up for the service, which enables immediate travel of autonomous vehicle 104 on the alternative or second canonical route selected or identified by the user. For example, service system 102 receives the route identification data from user device 108 before the user is picked up for the service.

In some non-limiting embodiments, the first canonical route is determined after receiving an indication that a user associated with user device 108 is on board autonomous vehicle 104. As an example, vehicle computing system 106 determines the first canonical route after the user is picked up for the service, which enables providing the user with the first canonical route on user device 108 during the trip so that the user can modify the first canonical route during the trip. For example, vehicle computing system 106 receives a request from user device 108 to modify the current route during the trip after the user is picked up for the service. In some implementations, vehicle computing system 106 determines the second canonical route based on the route identification data after receiving an indication that the user associated with user device 108 is on board autonomous vehicle 104. As an example, vehicle computing system 106 determines the second canonical route from the plurality of canonical routes based on the route identification data after the user is picked up for the service, which enables mid-trip modification of travel of autonomous vehicle 104 to travel on the alternative or second canonical route selected or identified by the user. For example, vehicle computing system 106 receives the route identification data from user device 108 after the user is picked up for the service.

In some non-limiting embodiments, the first canonical route is determined before receiving an indication that a user associated with user device 108 is on board autonomous vehicle 104, and the second canonical route is determined after receiving an indication that the user associated with user device 108 is on board autonomous vehicle 104. As an example, service system 102 determines the first canonical route before the user is picked up for the service, and vehicle computing system 106 determines the second canonical route after receiving an indication that a user associated with user device 108 is on board autonomous vehicle 104. For example, service system 102 receives a request for service from user device 108 route before the user is picked up for the service and determines the first canonical route based on request data associated with the request for service, and vehicle computing system 106 receives route identification data from user device 108 after the user is picked up for the service and determines the second canonical route based on the route identification data.

As further shown in FIG. 4, at step 412, process 400 includes providing second route data associated with the second canonical route for controlling travel of the autonomous vehicle on the second canonical route. For example, service system 102 and/or vehicle computing system 106 provide second route data associated with the second canonical route for controlling travel of the autonomous vehicle on the second canonical route. In some non-limiting embodiments, the second route data is associated with a second subset of the one or more roadways in the plurality of canonical routes. For example, the second route data identifies one or more roadways that are connected with another roadway in the geographic location and/or information associated with the roadways, such as map data associated with the roadways, for the second canonical route. In some non-limiting embodiments, the second route data includes current condition data and/or service data associated with the roadways as described in more detail below with respect to FIG. 5.

In some non-limiting embodiments, vehicle computing system 106 provides the second route data and controls travel of autonomous vehicle 104 on the second canonical route based on the second route data. For example, vehicle computing system 106 of autonomous vehicle 104 provides one or more control signals based on the second route data to other on-board systems of the vehicle (e.g., vehicle controls 218) that control travel of autonomous vehicle 104 on the second canonical route. In some non-limiting embodiments, service system 102 transmits the second route data associated with the second canonical route to vehicle computing system 106 of autonomous vehicle 104, and vehicle computing system 106 of autonomous vehicle 104 controls travel of autonomous vehicle 104 on the second canonical route based on the second route data. For example, service system 102 communicates, via network 110, the second route data associated with the second canonical route to vehicle computing system 106 of autonomous vehicle 104.

In some non-limiting embodiments, service system 102 and/or vehicle computing system 106 provide the second route data for display on user device 108. As an example, user device 108, such as a smartphone of the user, and/or user device 108 implemented as a vehicle computing device, such as a tablet computer integrated within autonomous vehicle 104, displays one or more images representing the second canonical route within an image map of the geographic location.

Figure 5:
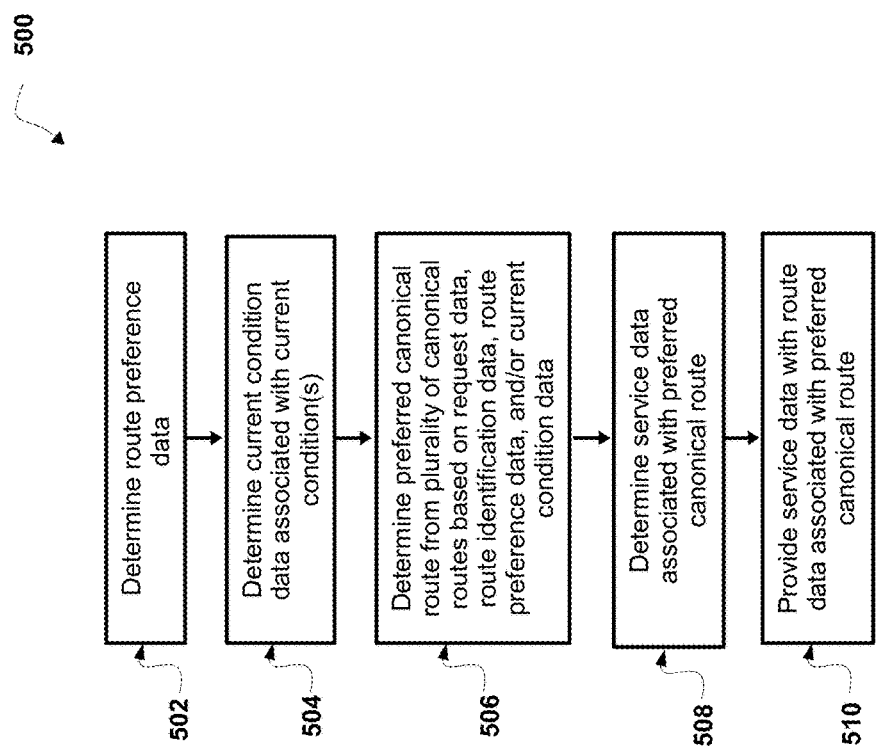
FIG. 5 is a flowchart of a non-limiting embodiment or aspect of a process for determining and providing alternative routes.

Referring now to FIG. 5, FIG. 5 is a flowchart of a non-limiting embodiment of a process 500 for determining and providing alternative routes. In some non-limiting embodiments, one or more of the steps of process 500 are performed (e.g., completely, partially, etc.) by service system 102 (e.g., one or more devices of service system 102). In some non-limiting embodiments, one or more steps of process 500 are performed (e.g., completely, partially, etc.) by vehicle computing system 106 (e.g., one or more devices of vehicle computing system 106). In some non-limiting embodiments, one or more steps of process 500 are performed by service system 102 (e.g., one or more devices of service system 102) and one or more steps of process 500 are performed (e.g., completely, partially, etc.) by vehicle computing system 106 (e.g., one or more devices of vehicle computing system 106). For example, a computer system is implemented within service system 102 or vehicle computing system 106, or implemented as multiple, distributed systems within and/or across service system 102 and vehicle computing system 106. In some non-limiting embodiments, one or more of the steps of process 500 are performed (e.g., completely, partially, etc.) by another device or a group of devices separate from or including service system 102 and/or vehicle computing system 106, such as autonomous vehicle 104 (e.g., one or more devices of autonomous vehicle 104), and/or user device 108 (e.g., one or more devices of user device 108).

As shown in FIG. 5, at step 502, process 500 includes determining route preference data. In some non-limiting embodiments, route preference data is associated with one or more route preferences related to one or more routes or roadways. As an example, route preferences correspond and/or map to attributes associated with routes or roadways (e.g., as defined in map data and/or current condition data associated with the routes or roadways). In some non-limiting embodiments, route preferences are associated with factors or weights that modify costs of routes or roadways associated with attributes that correspond and/or map to the route preferences, where the costs of the routes or roadways are used for including or favoring the routes or roadways (or excluding or disfavoring the routes or roadways) for determination as the first canonical route and/or the second canonical route.

In some non-limiting embodiments, route preference data is associated with one or more of the following: route preferences for types of routes or roadways (e.g., preferences for routes or roadways associated with attributes of one or more of highways, local roadways, toll roadways, faster moving traffic and/or higher speed limits, slower moving traffic and/or lower speed limits, etc.), route preferences for types of waypoints or stops on routes or roadways (e.g., preferences for waypoints or stops associated with attributes of one or more of restaurants, grocery stores, tourist attractions, etc.), route preferences for current conditions of routes or roadways (e.g., preferences for routes or roadways associated with attributes of one or more current conditions, such as one or more of traffic conditions, weather conditions, safety conditions, etc.), route preferences for unique routes or roadways (e.g., roadways or routes associated with attributes of a specific or unique address or geolocation, etc.), route preferences for unique waypoints or stops (e.g., waypoints or stops associated with attributes of a specific or unique address or geolocation, etc.), route preferences for route or roadway driving styles (e.g., preferences for routes or roadways associated with attributes of one or more of aggressive driving, passive driving, etc.), route preferences for route or roadway driving characteristics (e.g., preferences for routes or roadways associated with attributes of one or more of higher or lower frequencies and/or magnitudes of braking, acceleration, turning, lane changing, etc.), route preferences for route or roadway driving modes (e.g., preferences for routes or roadways associated with attributes of one or more of faster estimated destination arrival time (or trip duration), slower estimated destination arrival time (or trip duration), higher estimated financial costs or fares, lower estimated financial costs or fares, longer distances of travel, shorter distances of travel, etc.), route preferences for route or roadway travel modes (e.g., preferences for routes or roadways associated with attributes of one or more of a tourist route, a scenic route, a business route, etc.), and/or the like. For example, the one or more routes or roadways in the plurality of canonical routes are associated with attributes corresponding or mapping to one or more of the route preferences associated with the route preference data, such as attributes associated with types of the one or more routes or roadways, attributes associated with types of waypoints or stops on the one or more routes or roadways, attributes associated with one or more current conditions on the one or more routes or roadways, attributes associated with unique addresses or geolocations of the one or more routes or roadways, attributes associated with unique addresses or geolocations of waypoints or stops on the one or more routes or roadways, attributes associated with route or roadway driving style of the one or more routes or roadways, attributes associated with route or roadway driving characteristics of the one or more routes or roadways, attributes associated with driving modes of the one or more routes or roadways, attributes associated with travel modes of the one or more routes or roadways, and/or the like.

In some non-limiting embodiments, route preference data is associated with time data. As an example, a route preference is associated with and/or is mapped to an attribute of a route or roadway based on whether time data associated with the route preference corresponds to a current time associated with the current trip. For example, the route preference is associated with and/or is mapped to an attribute of a route or roadway based on the time data associated with the route preference corresponding to the current time, and the route preference is not associated with and/or mapped to the attribute of the roadway based on the time data associated with the route preference not corresponding to the current time. For example, route preferences can be associated with seasons, months, weeks, days, and time periods within days, such as a time period for a work commute, a time period for going out socially in the evening, etc., such that a route preference of a user is only considered or used during a desired time period.

In some non-limiting embodiments, service system 102 and/or vehicle computing system 106 store route preference data associated with a plurality of users in a database, for example, in a database of user profiles associated with identifiers of the plurality of users, and service system 102 and/or vehicle computing system 106 retrieve (e.g., obtain) route preference data for the user associated with user device 108 from the database based on the request data (e.g., based on an identifier of the user or user device 108 in the request data). For example, service system 102 and/or vehicle computing system 106 retrieve route preference data stored for the user in the user profile of the user in response to receiving a request for service from user device 108.

In some non-limiting embodiments, service system 102 and/or vehicle computing system 106 determines one or more route preferences for the user based on other information about the user stored in a user profile. For example, a machine learning technique can be used to determine route preferences of a user based on known information of the user, such as demographic and/or location information, when route preferences are not provided by the user.

In some non-limiting embodiments, service system 102 and/or vehicle computing system 106 receive route preference data for the user associated with user device 108 with a request from user device 108. As an example, a request for service can include route preference data indicating a route preference for use in determining routing for the trip, for example, route preference data input via user device 108 by the user when sending the request for service. As another example, a request to modify a current trip or route over which autonomous vehicle 104 is currently traveling can include route preference data indicating a route preference for use in determining an alternative route, for example, route preference data input via user device 108 by the user during the trip.

In some non-limiting embodiments, service system 102 and/or vehicle computing system 106 receive route preference data for the user associated with user device 108 with route identification data from user device 108. As an example, route identification data associated with identifying an alternative canonical route after providing the first route data associated with the first canonical route can include route preference data including one or more route preferences that service system 102 and/or vehicle computing system 106 can use to determine the alternative or second canonical route, for example, route preference data input via user device 108 by the user in response to the first route data.

As further shown in FIG. 5, at step 504, process 500 includes determining current condition data associated with at least one current condition associated with the plurality of canonical routes. In some non-limiting embodiments, current condition data is associated with one or more current conditions associated with one or more routes or roadways in the plurality of routes. As an example, current condition data is associated with dynamic attributes of routes or roadways. In some non-limiting embodiments, one or more current conditions are associated with factors or weights that modify costs of routes or roadways associated with the current conditions, where the costs of the routes or roadways are used for including or favoring the routes or roadways (or excluding or disfavoring the routes or roadways) for determination as the first canonical route and/or the second canonical route.

In some non-limiting embodiments, current condition data is associated with one or more of the following: current weather/environmental conditions of routes or roadways (e.g., routes or roadways associated with one or more of snow, rain, high wind speeds, flooding, low visibility, etc.), current traffic conditions of routes or roadways (e.g., routes or roadways associated with one or more of heavy traffic, light traffic, longer delay times, shorter delay times, etc.), current safety conditions of routes or roadways (e.g., routes or roadways associated with one or more of storm warnings, flood warnings, police alerts, etc.), current temporary road conditions of routes or roadways (e.g., routes or roadways associated with one or more of traffic accidents, construction, etc.), current special event conditions of routes or roadways (e.g., routes or roadways associated with one or more of sporting events, concerts, etc.), a current estimated remaining travel time on a route or roadway, a supply of autonomous vehicles associated with service system 102 within a threshold distance of a route or roadway, and/or the like.

In some non-limiting embodiments, service system 102 and/or vehicle computing system 106 receive current condition data, from one or more systems on board autonomous vehicle 104, such as one or more sensors, traffic monitoring systems, weather monitoring systems, and/or the like. In some non-limiting embodiments, service system 102 and/or vehicle computing system 106 receive current condition data, from one or more systems on board other autonomous vehicles currently on the plurality of routes within the geographic location, such as one or more sensors, traffic monitoring systems, weather monitoring systems, and/or the like. For example, service system 102 can be associated with a plurality of autonomous vehicles in a geographic location, and service system 102 can provide updated current conditions from the one or more other autonomous vehicles to autonomous vehicle 104. In some non-limiting embodiments, service system 102 and/or vehicle computing system 106 receive current condition data from one or more external systems, such as one or more traffic monitoring systems, weather monitoring systems, and/or the like. For example, service system 102 and/or vehicle computing system 106 receive current condition data from a civil traffic monitoring system, a national weather service system, an emergency broadcast system, and/or the like.

As further shown in FIG. 5, at step 506, process 500 includes determining a preferred canonical route based on request data, route identification data, route preference data, and/or current condition data. As an example, service system 102 and/or vehicle computing system 106 determine a preferred canonical route (e.g., the first canonical route and/or the second canonical route) between the pick-up location (or a current location) and the destination location (and, if necessary, waypoints therebetween) from the plurality of canonical routes based on request data, route identification data, route preference data, and/or current condition data.

In some non-limiting embodiments, the request data, route identification data, route preference data, and/or current condition data is associated with factors or weights that modify costs of routes or roadways in the plurality of canonical routes that are associated with and/or mapped to the request data, route identification data, route preference data, and/or current condition data, where the costs of the routes or roadways are used for including or favoring the routes or roadways (or excluding or disfavoring the routes or roadways) for determination as the preferred canonical route. For example, service system 102 and/or vehicle computing system 106 determine routes or roadways associated with costs that satisfy one or more threshold costs as the preferred canonical route (e.g., as the first canonical route or the second canonical route).

In some non-limiting embodiments, service system 102 and/or vehicle computing system 106 generate the preferred canonical route (e.g., the first canonical route and/or the second canonical route) based on a machine learning technique (e.g., a pattern recognition technique, a data mining technique, a heuristic technique, a supervised learning technique, an unsupervised learning technique, etc.). For example, service system 102 and/or vehicle computing system 106 generate a model (e.g., an estimator, a classifier, a prediction model, etc.) based on a machine learning algorithm (e.g., a decision tree algorithm, a gradient boosted decision tree algorithm, a neural network algorithm, a convolutional neural network algorithm, etc.). In such an example, service system 102 and/or vehicle computing system 106 generate the preferred canonical route using the model.

In some non-limiting embodiments, service system 102 and/or vehicle computing system 106 generate a prediction model (e.g., a route prediction model) based on map data, request data, route identification data, route preference data, and/or current condition data, which may be referred to collectively as routing data, associated with one or more routes or roadways over one or more requests or autonomous vehicle trips. In some implementations, the prediction model includes a model designed to receive, as an input, routing data associated with one or more routes or roadways for an autonomous vehicle trip, and provide, as an output a prediction (e.g., a probability, a binary output, a yes-no output, a score, a prediction score, etc.) as to whether the one or more routes or roadways are included in a preferred canonical route for the request or autonomous vehicle trip. In some non-limiting embodiments, service system 102 stores the prediction model (e.g., for later use). In some non-limiting embodiments, service system 102 and/or vehicle computing system 106 store the prediction model in a data structure (e.g., a database, a linked list, a tree, etc.). The data structure can be located within service system 102 and/or vehicle computing system 106 or external, and possibly remote from, service system 102 and/or vehicle computing system 106.

In some non-limiting embodiments, service system 102 and/or vehicle computing system 106 process routing data to obtain training data for the prediction model. For example, service system 102 and/or vehicle computing system 106 process the routing data to change the routing data into a format that can be analyzed (e.g., by service system 102 and/or vehicle computing system 106) to generate a prediction model. The routing data that is changed may be referred to as training data. In some implementations, service system 102 and/or vehicle computing system 106 process the routing data to obtain the training data based on receiving the routing data. Additionally, or alternatively, service system 102 and/or vehicle computing system 106 process the routing data to obtain the training data based on service system 102 and/or vehicle computing system 106 receiving an indication that service system 102 and/or vehicle computing system 106 is to process the routing data from a user of service system 102 and/or vehicle computing system 106, such as when service system 102 and/or vehicle computing system 106 receive an indication to create a prediction model for one or more routes or roadways associated with a request or autonomous vehicle trip.

In some non-limiting embodiments, service system 102 and/or vehicle computing system 106 process the routing data by determining a routing variable based on the routing data. A routing variable can include a metric, associated with a preferred canonical route, which can be derived based on the routing data. The routing variable can be analyzed to generate a prediction model. For example, the routing variable includes a variable associated with map data of a request or trip, a variable associated with request data of a request or trip, a variable associated with route identification data of a request or trip, a variable associated with route preference data of a request or trip, and/or a variable associated with current condition data of a request or trip. In some non-limiting embodiments, the routing variable includes a variable associated with a pick-up location (or a current location) of a request or trip, a variable associated with a destination location of a request or trip, a variable associated with a type of a request or trip, and/or the like. In some non-limiting embodiments, the routing variable includes a variable associated with a route preference. In some non-limiting embodiments, the routing variable includes a variable associated with an attribute of a route or roadway. In some non-limiting embodiments, the routing variable includes a variable associated with a current condition of a route or roadway. In some non-limiting embodiments, the routing variable includes a variable associated with an identification of a route or roadway.

In some non-limiting embodiments, service system 102 and/or vehicle computing system 106 analyze the training data to generate the prediction model. For example, service system 102 and/or vehicle computing system 106 use machine learning techniques to analyze the training data to generate the prediction model. In some implementations, generating the prediction model (e.g., based on training data obtained from routing data, based on training data obtained from historical routing data, etc.) may be referred to as training the prediction model. The machine learning techniques include, for example, supervised and/or unsupervised techniques, such as decision trees (e.g., gradient boosted decision trees), logistic regressions, artificial neural networks (e.g., convolutional neural networks), Bayesian statistics, learning automata, Hidden Markov Modeling, linear classifiers, quadratic classifiers, association rule learning, or the like. In some non-limiting embodiments, the prediction model includes a model that is specific to a particular geographic location, particular routes or roadways associated with a geographic location, and/or the like. Additionally, or alternatively, the prediction model can be specific to a particular user (e.g., an operator of an autonomous vehicle, an entity that operates an autonomous vehicle, etc.). In some implementations, service system 102 and/or vehicle computing system 106 generate one or more prediction models for one or more operators of one or more autonomous vehicles, a particular group of autonomous vehicles, and/or the like.

Additionally, or alternatively, when analyzing the training data, service system 102 and/or vehicle computing system 106 identify one or more image variables (e.g., one or more independent routing variables) as predictor variables that can be used to make a prediction (e.g., when analyzing the training data). In some implementations, values of the predictor variables are inputs to the prediction model. For example, service system 102 and/or vehicle computing system 106 identify a subset (e.g., a proper subset) of routing variables as predictor variables that are used to accurately predict whether one or more routes or roadways associated with a request or an autonomous vehicle trip is included in a preferred canonical route for the request or trip. In some implementations, the predictor variables include one or more of the routing variables, as discussed above, that have a significant impact (e.g., an impact satisfying a threshold) on a probability that the one or more routes or roadways of the request or trip are included in a preferred canonical route for the request or trip.

In some non-limiting embodiments, service system 102 and/or vehicle computing system 106 validate the prediction model. For example, service system 102 and/or vehicle computing system 106 validate the prediction model after service system 102 and/or vehicle computing system 106 generate the prediction model. In some implementations, service system 102 and/or vehicle computing system 106 validate the prediction model based on a portion of the training data to be used for validation. For example, service system 102 and/or vehicle computing system 106 partition the training data into a first portion and a second portion, where the first portion is used to generate the prediction model, as described above. In this example, the second portion of the training data (e.g., the validation data) is used to validate the prediction model.

In some implementations, service system 102 and/or vehicle computing system 106 validate the prediction model by providing validation data associated with one or more routes or roadways as input to the prediction model, and determining, based on an output of the prediction model, whether the prediction model correctly, or incorrectly, predicted the one or more routes or roadways included in the canonical route. In some implementations, service system 102 and/or vehicle computing system 106 validate the prediction model based on a validation threshold. For example, service system 102 and/or vehicle computing system 106 are configured to validate the prediction model when one or more routes or roadways are correctly predicted by the prediction model (e.g., when the prediction model correctly predicts 50% of the validation data, 70% of the validation data, a threshold quantity of the validation data, etc.) as included in the canonical route.

In some implementations, if service system 102 and/or vehicle computing system 106 does not validate the prediction model (e.g., when a percentage of validation data does not satisfy the validation threshold), service system 102 and/or vehicle computing system 106 generate additional prediction models.

In some non-limiting embodiments, once the prediction model has been validated, service system 102 and/or vehicle computing system 106 further train the prediction model and/or create new prediction models based on receiving new training data. The new training data can include routing data associated with one or more other trips and/or one or more other routes or roadways.

As further shown in FIG. 5, at step 508, process 500 includes determining service data associated with the preferred canonical route (e.g., the first canonical route and/or the second canonical route). As an example, service system 102 and/or vehicle computing system 106 determine at least one of one or more estimated financial costs associated with the first canonical route (and/or the second canonical route), for example, a fare value for a user to receive transport via a route, and one or more estimated arrival times (or trip durations) associated with the first canonical route (and/or the second canonical route). For example, service system 102 and/or vehicle computing system 106 determine the one or more estimated financial costs or fares and/or the one or more estimated arrival times or trip durations according to a fare calculation function and/or a trip duration function based on current rates for a service associated with a request or trip, the map data, the request data, the route identification data, the route preference data, and/or the current condition data.

As further shown in FIG. 5, at step 510, process 500 includes providing the service data associated with route data associated with the preferred canonical route. As an example, service system 102 and/or vehicle computing system 106 provide the service data with the first route data associated with the at least one first canonical route and/or the second route data associated with the at least one second canonical route to user device 108 (e.g., for display on user device 108). For example, service system 102 and/or vehicle computing system 106 provide the estimated financial cost and/or estimated arrival time with the first route data and/or the second route data to user device 108 of the user, which enables the user to consider the estimated cost and/or amount of time associated with travel on the first canonical route and/or the second canonical route.

In some non-limiting embodiments, service system 102 and/or vehicle computing system 106 provide service data associated locations on the first canonical route (and/or the second canonical route), such as a pick-up location, a current location, one or more waypoints, a destination location, and/or one or more points of interest. As an example, service system 102 and/or vehicle computing system 106 provide service data associated with locations on a route based on route preference data and/or current condition data associated with the route. For example, service system 102 and/or vehicle computing system 106 provide information associated with landmarks and/or popular locations on a route determined to satisfy route preference data associated with a preference for tourist routes and/or information associated with current weather and/or traffic conditions on a route.

Figure 6A:
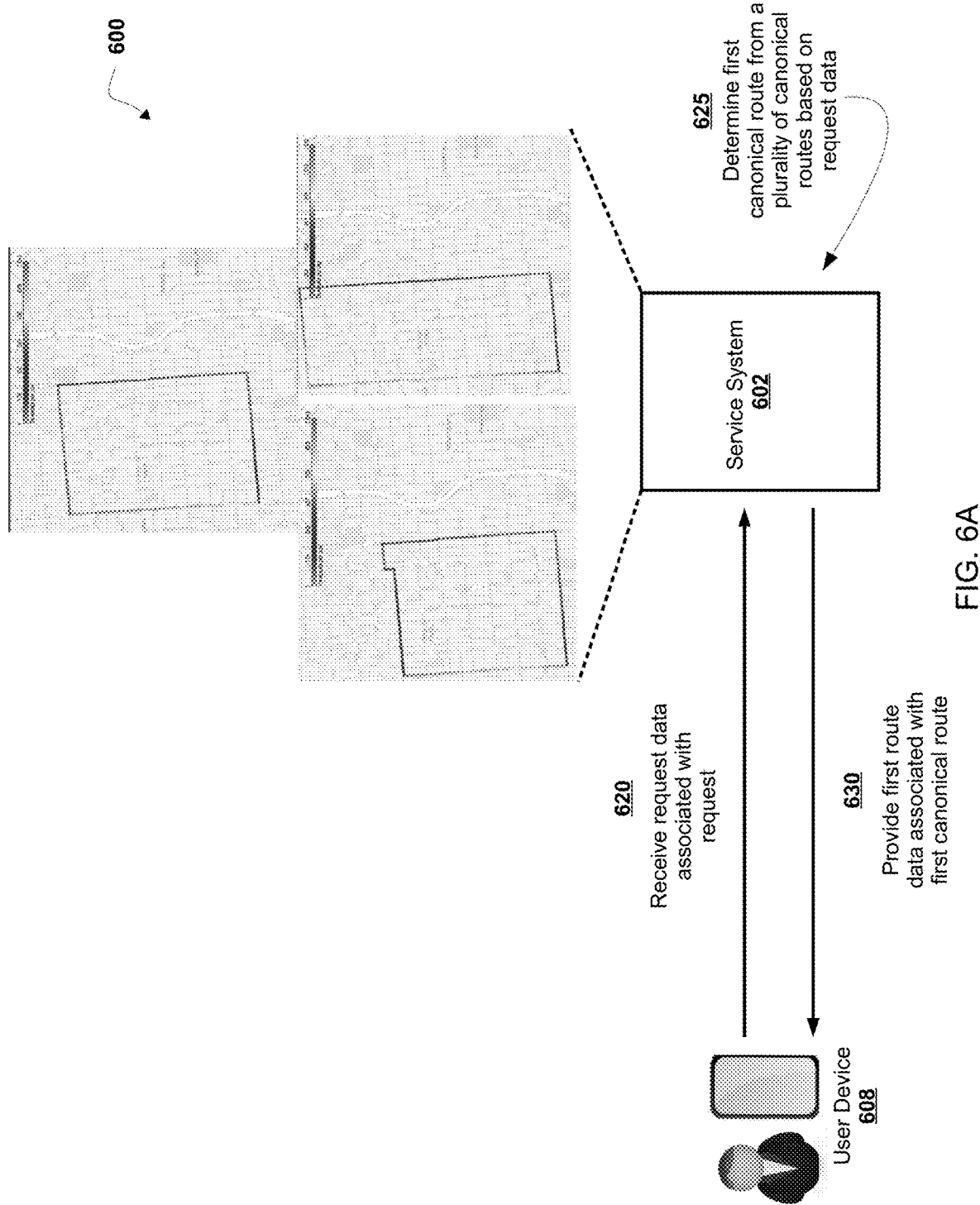
FIGS. 6A-6C are diagrams of an implementation of a non-limiting embodiment or aspect of a process disclosed herein.
Figure 6B:
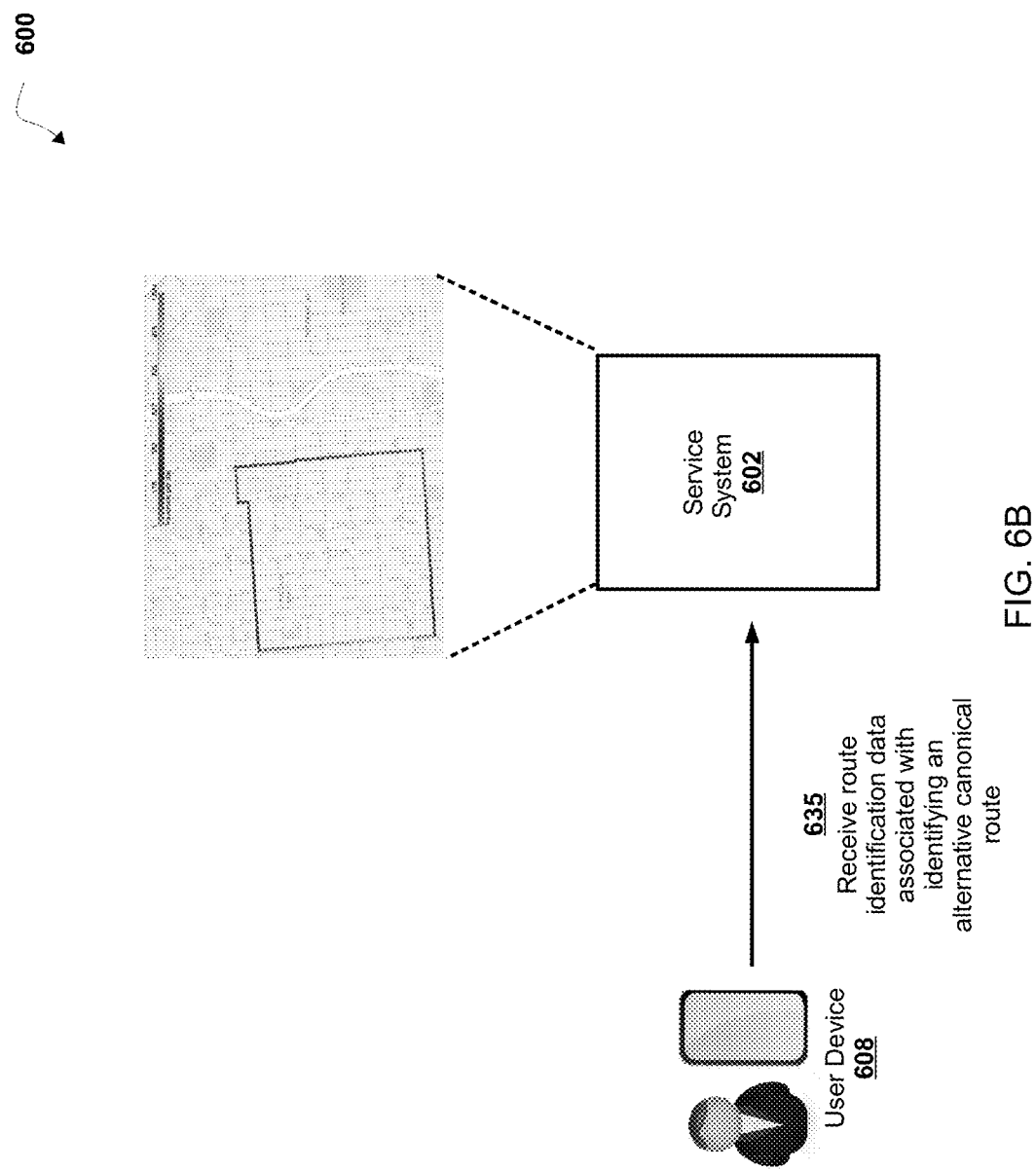
Figure 6C:
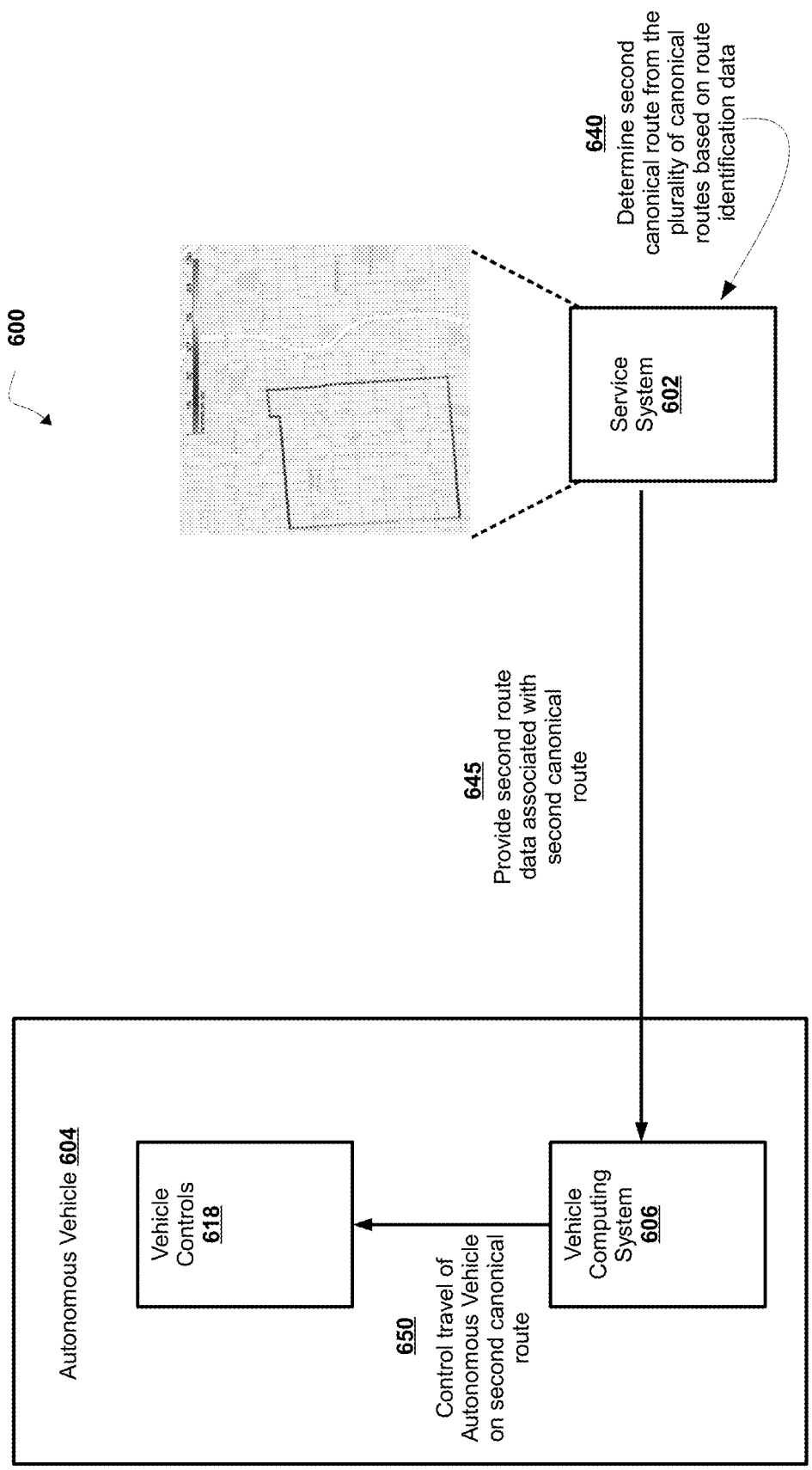

FIGS. 6A-6C are diagrams of an overview of a non-limiting embodiment of an implementation 600 relating to a process for determining and providing alternative routes. As shown in FIGS. 6A-6C, implementation 600 includes service system 602, autonomous vehicle 604, vehicle computing system 606, user device 608, and vehicle controls 618. In some non-limiting embodiments, service system 602 may be the same or similar to service system 102. In some non-limiting embodiments, autonomous vehicle 604 may be the same or similar to autonomous vehicle 104. In some non-limiting embodiments, vehicle computing system 606 may be the same or similar to vehicle computing system 106. In some non-limiting embodiments, user device 608 may be the same or similar to user device 108. In some non-limiting embodiments, vehicle controls 618 may be the same or similar to vehicle controls 218.

As shown by reference number 620 in FIG. 6A, service system 602 receives request data associated with a request from user device 608. In some non-limiting embodiments, the request data is associated with a request for service (e.g., a request for transportation), and the request data includes an identifier of the user and/or user device 608 associated with the request, a pick-up location, and a destination location. As an example, service system 602 receives the request before the user is picked up for the service. For example, the request can include a request for transportation within a geographic location from the pick-up location (e.g., from an airport located proximate an outer edge of a city), to the destination location (e.g., to a hotel located within the city).

As further shown by reference number 625 in FIG. 6A, service system 602 determines a first canonical route based on the request data. In some non-limiting embodiments, service system 602 determines the first canonical route before receiving an indication that a user associated with user device 608 is on board autonomous vehicle 604. In some non-limiting embodiments, service system 602 determines the first canonical route between the pick-up location and the destination location based on the map. For example, the first canonical route includes one or more routes that are not generated based on data associated with identifying an alternative canonical route.

In some non-limiting embodiments, service system 602 determines the first canonical route between the pick-up location and the destination location based on the map, route preference data, and/or route identification data. As an example, service system 602 retrieves route preference data from a user profile of the user based on the identifier of the user or user device 608 included in the request data. For example, the route preference data can be associated with a route preference for routes or roadways associated with tourist routes. In some non-limiting embodiments, service system 602 determines the first canonical route based on the route preference data. As an example, service system 602 determines the first canonical route by including or favoring one or more routes or roadways associated with tourist routes for determination as the first canonical route. For example, service system 602 determines the first canonical route as including a waterfront tourist route including routes or roadways associated with a waterfront area of the city, a downtown tourist route including routes or roadways associated with a downtown area of the city, and a suburban tourist route including routes or roadways associated with a suburban area of the city. In some non-limiting embodiments, service system 602 determines the first canonical route based on current condition data. As an example, service system 602 determines one or more routes or roadways associated with tourist routes as the first canonical route based on current traffic conditions on the one or more routes. For example, service system 602 can determine the first canonical route to minimize traffic while routing over routes or roadways associated with tourist routes.

As further shown by reference number 630 in FIG. 6A, service system 602 provides first route data associated with the first canonical route to user device 608. In some non-limiting embodiments, service system 602 determines and provides the first route data associated with the first canonical route to user device 608 before the user is picked up for the service, which enables providing the user with the first canonical route on user device 608 in advance of the trip so that the user has time to consider the first canonical route and service system 602 can receive route identification data associated with identifying an alternative canonical route before the user is picked up for the service. As an example, service system 602 transmits the first route data to user device 608 over a wireless communication network, and user device 608 displays the first canonical route to the user based on the route data. For example, user device 608 can display an image map of the city with a representation of the first canonical route including the one or more routes or roadways associated with tourist routes identified in the image map. In some non-limiting embodiments, user device 608 displays a prompt or option to the user to identify or select an alternative canonical route in the image map of the city. As an example, user device 608 can display a prompt to the user to select or identify one or more routes or roadways of the first canonical route as the alternative canonical route. For example, user device 608 can display a prompt to the user to select or identify one or more routes or roadways of the waterfront tourist route including routes or roadways associated with a waterfront area of the city, the downtown tourist route including routes or roadways associated with a downtown area of the city, and the suburban tourist route including routes or roadways associated with a suburban area of the city as the alternative canonical route. In some non-limiting embodiments, the user selects or identifies one or more routes or roadways outside of the first canonical route in the image map of the city for the alternative canonical route. As an example, the user can add, remove, and/or replace one or more routes or roadways of the first canonical route with one or more other routes or roadways in the image map of the city. For example, the user can drag highlighted routes or roadways within the image map of the geographic location displayed on user device 608 to include or favor and/or exclude or disfavor certain routes or roadways in the alternative canonical route.

In some non-limiting embodiments, service system 602 determines service data including one or more estimated financial costs or fares and/or the one or more estimated arrival times or trip durations associated with the first canonical route and provides the service data to user device 608 with the first route data. As an example, user device 608 can display a fare cost and estimated arrival time associated with each of the waterfront tourist route, the downtown tourist route, and the suburban tourist route.

As shown by reference number 635 in FIG. 6B, service system 602 receives route identification data associated with identifying an alternative canonical route from user device 608. As an example, service system 602 receives an identification from user device 608 associated with a selection or identification of one or more routes or roadways within or outside the first canonical route as the alternative canonical route. For example, service system 602 receives a selection or identification of one or more routes or roadways of the waterfront tourist route including routes or roadways associated with a waterfront area of the city.

As shown by reference number 640 in FIG. 6C, service system 602 determines a second canonical route from the plurality of canonical routes based on the route identification data. In some non-limiting embodiments, the second canonical route is determined before receiving an indication that the user associated with user device 608 is on board autonomous vehicle 604. As an example, service system 602 determines the second canonical route from the plurality of canonical routes based on the route identification data before the user is picked up for the service, which enables immediate travel of autonomous vehicle 604 on the alternative or second canonical route selected or identified by the user. For example, service system 602 receives the route identification data from user device 608 before the user is picked up for the service.

In some non-limiting embodiments, service system 602 determines the second canonical route by including or favoring one or more routes or roadways associated with the alternative canonical route as the second canonical route. For example, based on the route identification data associated with an identification of the one or more routes or roadways of the waterfront tourist route, service system 602 determines the second canonical route as including the one or more routes or roadways within the waterfront tourist route. In some non-limiting embodiments, service system 602 determines the second canonical route based on current condition data. As an example, service system 602 determines one or more routes or roadways associated with the second canonical route based on current weather conditions on the one or more routes. For example, service system 602 can determine the second canonical route to avoid routes or roadways associated with low visibility (e.g., due to fog), while routing over routes or roadways associated with the alternative canonical route.

As further shown by reference number 645 in FIG. 6C, service system 602 provides second route data associated with the second canonical route to vehicle computing system 606 of autonomous vehicle 604. For example, service system 602 transmits the second route data associated with the second canonical route over a wireless communications network to vehicle computing system 606 of autonomous vehicle 604. In some non-limiting embodiments, service system 602 provides the second route data with service data to user device 608 (e.g., with a fare cost and/or estimated arrival time associated with the second canonical route).

As further shown by reference number 650 in FIG. 6C, vehicle computing system 606 controls travel of autonomous vehicle 604 on the second canonical route based on the second route data. For example, after receiving an indication that the user associated with user device 608 is on board autonomous vehicle 604, vehicle computing system 606 of autonomous vehicle 604 provides one or more control signals based on the second route data to vehicle controls 618 and the one or more control signals control travel of autonomous vehicle 604 on the second canonical route.

Figure 7A:
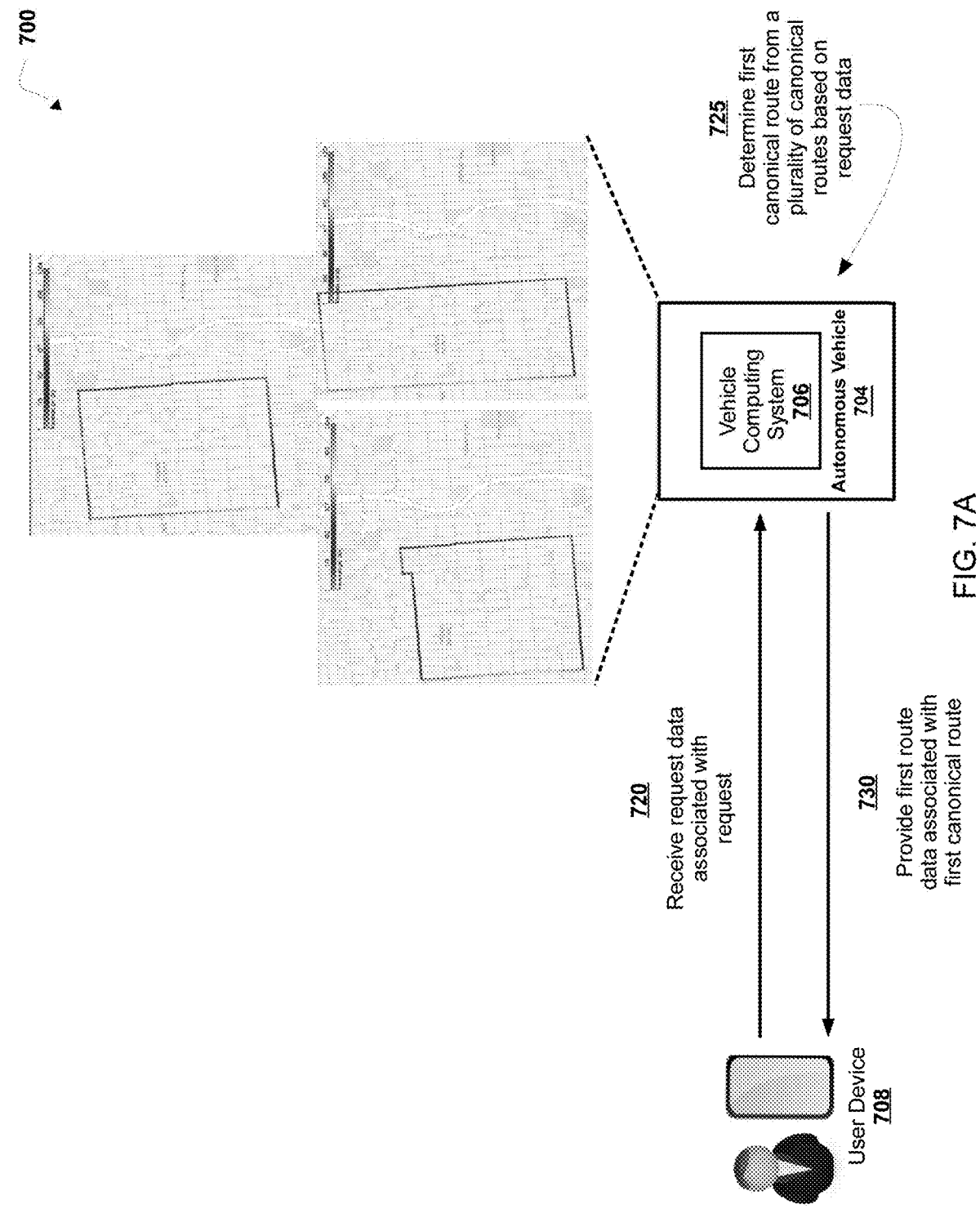
FIGS. 7A-7C are diagrams of an implementation of a non-limiting embodiment or aspect of a process disclosed herein.
Figure 7B:
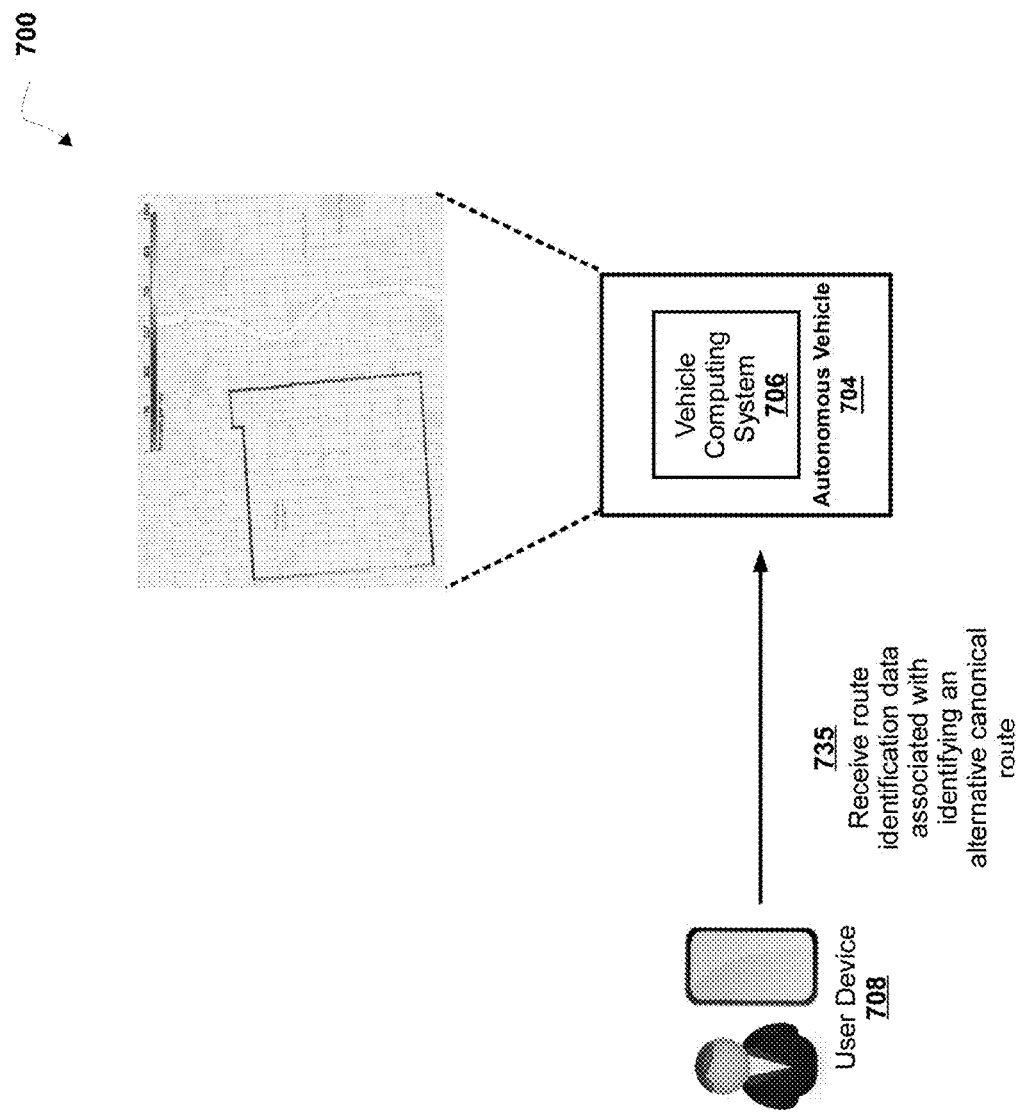
Figure 7C:
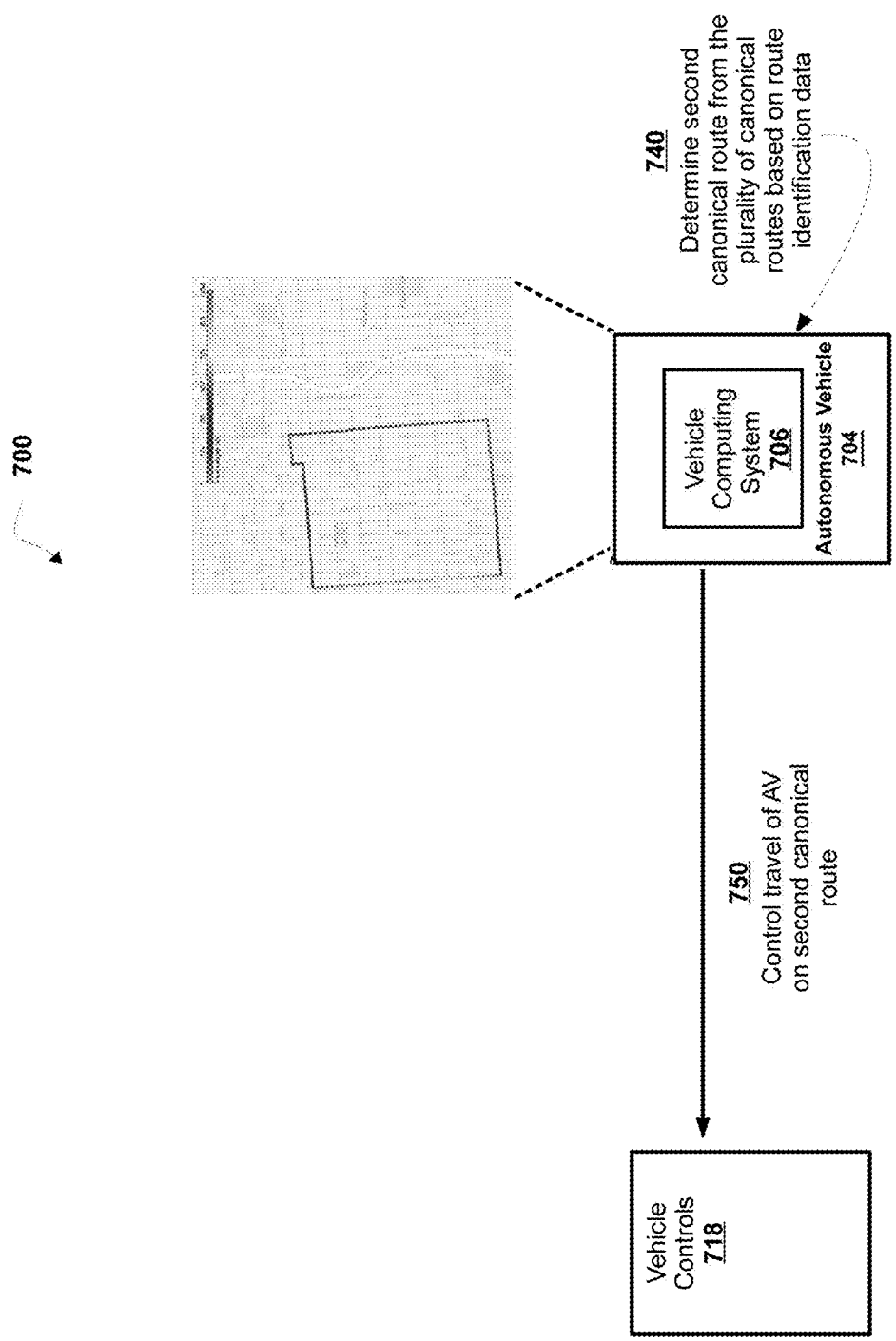

FIGS. 7A-7C are diagrams of an overview of a non-limiting embodiment of an implementation 700 relating to a process for determining and providing alternative routes. As shown in FIGS. 7A-7C, implementation 700 includes autonomous vehicle 704, vehicle computing system 706, user device 708, and vehicle controls 718. In some non-limiting embodiments, autonomous vehicle 704 may be the same or similar to autonomous vehicle 104. In some non-limiting embodiments, vehicle computing system 706 may be the same or similar to vehicle computing system 106 and/or vehicle computing system 606. In some non-limiting embodiments, user device 708 may be the same or similar to user device 108 and/or user device 608. In some non-limiting embodiments, vehicle controls 718 may be the same or similar to vehicle controls 218 and/or vehicle controls 618.

As shown by reference number 720 in FIG. 7A, vehicle computing system 706 receives request data associated with a request from user device 708. In some non-limiting embodiments, vehicle computing system 706 receives the request data from user device 708 during a trip, and the request data is associated with a request to modify a trip that is currently in progress (e.g., a request to modify a current canonical route over which autonomous vehicle 704 is currently traveling). As an example, vehicle computing system 706 receives the request data from user device 708 (e.g., from user device 708 implemented as a vehicle device on board autonomous vehicle 704) after the user associated with user device 708 is on board autonomous vehicle 704. For example, the request data is associated with a request to route over one or more alternative routes or roadways and/or to avoid routing over one or more routes or roadways (e.g., to route over locals roads instead of highways over which autonomous vehicle 704 is currently routed).

In some non-limiting embodiments, vehicle computing system 706 automatically transmits a prompt or option to user device 708 that prompts the user for a request based on one or more current conditions. For example, vehicle computing system 706 can determine that one or more routes or roadways (e.g., over which autonomous vehicle is currently routed) are associated with a traffic accident condition, provide user device with a prompt or option to determine one or more alternative canonical routes, and receive the request from user device 708 that includes request data associated with a request from the user to route over one or more alternative routes or roadways.

As further shown by reference number 725 in FIG. 7A, vehicle computing system 706 determines a first canonical route from a plurality of canonical routes based on the request data. As an example, vehicle computing system 706 determines the first canonical route based on the request by including or favoring routes or roadways associated with local roads and excluding or disfavoring highways for determination as the first canonical route. For example, vehicle computing system 706 can determine the first canonical route including one or more routes or roadways associated with attributes associated with local roads.

As further shown by reference number 730 in FIG. 7A, vehicle computing system 706 provides first route data associated with the first canonical route to user device 708. As an example, vehicle computing system 706 transmits image data for an image map of the geographic location including the first canonical route. For example, routes and roadways in the first canonical route can be highlighted in a display of the image map on user device 708.

As shown by reference number 735 in FIG. 7B, vehicle computing system 706 receives route identification data associated with identifying an alternative canonical route from user device 708. For example, vehicle computing system 706 receives route identification data associated with the user dragging highlighted routes or roadways within the displayed image map of the geographic location on user device 708 to select and/or identify certain routes or roadways within the map of the geographic location as an alternative canonical route.

As shown by reference number 740 in FIG. 7C, vehicle computing system 706 determines a second canonical route from the plurality of canonical routes based on the route identification data. As an example, based on the route identification data associated with the alternative canonical route, vehicle computing system 706 determines a second canonical route. For example, vehicle computing system 706 includes or favors the highlighted routes or roadways for determination as the second canonical route. In some non-limiting embodiments, vehicle computing system determines and/or provides second route data and/or service data associated with the second canonical route to user device 708 As an example, user device 708 can display a fare cost and estimated arrival time associated with the second canonical route.

As further shown by reference number 750 in FIG. 7C, vehicle computing system 706 controls travel of autonomous vehicle 704 on the second canonical route based on the second route data. For example, vehicle computing system 706 of autonomous vehicle 704 provides one or more control signals based on the second route data to vehicle controls 718 that control travel of autonomous vehicle 704 on the second canonical route.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.) and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, with a computer system comprising one or more processors, request data associated with a request from a user device;
   determining, with the computer system, a first canonical route from a plurality of canonical routes based on the request data, wherein each respective canonical route of the plurality of canonical routes satisfies at least one autonomy criteria associated with whether an autonomous vehicle can travel on the respective canonical route;
   providing, with the computer system, first route data associated with the first canonical route;
   receiving, with the computer system, route identification data associated with identifying an alternative canonical route after providing the first route data associated with the first canonical route;
   determining, with the computer system, a second canonical route from the plurality of canonical routes based on the route identification data;
   providing, with the computer system, second route data associated with the second canonical route for controlling travel of the autonomous vehicle on the second canonical route; and
   controlling, with the computer system, travel of the autonomous vehicle on the second canonical route based on the second route data.

2. The method of claim 1, wherein the first canonical route is determined before receiving an indication that a user associated with the user device is on board the autonomous vehicle.

3. The method of claim 2, wherein the second canonical route is determined after receiving the indication that the user associated with the user device is on board the autonomous vehicle.

4. The method of claim 2, wherein the second canonical route is determined before receiving the indication that the user associated with the user device is on board the autonomous vehicle.

5. The method of claim 1, wherein the first canonical route is determined after receiving an indication that a user associated with the user device is on board the autonomous vehicle.

6. The method of claim 1, further comprising:
   communicating, with the computer system, the second route data associated with the second canonical route to a vehicle computing system of the autonomous vehicle, wherein the vehicle computing system of the autonomous vehicle controls travel of the autonomous vehicle on the second canonical route based on the second route data.

7. The method of claim 1, further comprising:
   determining, with the computer system, route preference data based on the request data; and
   determining, with the computer system, at least one of the first canonical route and the second canonical route based on the route preference data.

8. The method of claim 1, wherein the each respective canonical route of the plurality of canonical routes satisfies at least one objective function derived from trip data associated with one or more traversals of the plurality of canonical routes by one or more autonomous vehicles.

9. The method of claim 1, wherein the plurality of canonical routes comprises one or more roadways, wherein the first route data is associated with a first subset of the one or more roadways, wherein the second route data is associated with a second subset of the one or more roadways.

10. The method of claim 1, wherein determining at least one of the first canonical route and the second canonical route further comprises determining the at least one of the first canonical route and the second canonical route based on current condition data associated with at least one current condition associated with the plurality of canonical routes.

11. A computing system, comprising:
   one or more processors programmed or configured to:
      receive request data associated with a request from a user device;
      determine a first canonical route from a plurality of canonical routes based on the request data, wherein each respective canonical route of the plurality of canonical routes satisfies at least one autonomy criteria associated with whether an autonomous vehicle can travel on the respective canonical route;
      provide first route data associated with the first canonical route;
      receive route identification data associated with identifying an alternative canonical route after providing the first route data associated with the first canonical route;
      determine a second canonical route from the plurality of canonical routes based on the route identification data;
      provide second route data associated with the second canonical route for controlling travel of the autonomous vehicle on the second canonical route; and
      control travel of the autonomous vehicle on the second canonical route based on the second route data.

12. The computing system of claim 11, wherein the one or more processors are further programmed or configured to:
   communicate the second route data associated with the second canonical route to a vehicle computing system of the autonomous vehicle comprising one or more processors, wherein the vehicle computing system of the autonomous vehicle controls travel of the autonomous vehicle on the second canonical route based on the second route data.

13. The computing system of claim 11, wherein the each respective canonical route of the plurality of canonical routes satisfies at least one objective function derived from trip data associated with one or more traversals of the plurality of canonical routes by one or more autonomous vehicles.

14. The computing system of claim 11, wherein the plurality of canonical routes comprises one or more roadways, wherein the first route data is associated with a first subset of the one or more roadways, wherein the second route data is associated with a second subset of the one or more roadways.

15. An autonomous vehicle, comprising:
    one or more sensors for detecting an object in an environment surrounding the autonomous vehicle; and
    a vehicle computing system comprising one or more processors, wherein the vehicle computing system is programmed or configured to:
        receive request data associated with a request from a user device;
        determine a first canonical route from a plurality of canonical routes based on the request data, wherein each respective canonical route of the plurality of canonical routes satisfies at least one autonomy criteria associated with whether an autonomous vehicle can travel on the respective canonical route;
        provide first route data associated with the first canonical route;
        receive route identification data associated with identifying an alternative canonical route after providing the first route data associated with the first canonical route;
        determine a second canonical route from the plurality of canonical routes based on the route identification data;
        provide second route data associated with the second canonical route; and
        control travel of the autonomous vehicle on the second canonical route based on the second route data and sensor data from the one or more sensors.

16. The autonomous vehicle of claim 15, wherein the each respective canonical route of the plurality of canonical routes satisfies at least one objective function derived from trip data associated with one or more traversals of the plurality of canonical routes by one or more autonomous vehicles.

17. The autonomous vehicle of claim 15, wherein the plurality of canonical routes comprises one or more roadways, wherein the first route data is associated with a first subset of the one or more roadways, and wherein the second route data is associated with a second subset of the one or more roadways.

18. The autonomous vehicle of claim 15, wherein the first canonical route is determined after receiving an indication that a user associated with the user device is on board the autonomous vehicle.

* * * * *